US008538688B2

(12) United States Patent
Prehofer

(10) Patent No.: US 8,538,688 B2
(45) Date of Patent: Sep. 17, 2013

(54) USER GENERATED PEDESTRIAN AND INDOOR SHORTCUT ROUTES FOR NAVIGATION SYSTEMS

(75) Inventor: Christian Prehofer, Espoo (FI)

(73) Assignee: Nokia Corporation, Espoo (FI)

( * ) Notice: Subject to any disclaimer, the term of this patent is extended or adjusted under 35 U.S.C. 154(b) by 841 days.

(21) Appl. No.: 12/273,285

(22) Filed: Nov. 18, 2008

(65) Prior Publication Data

US 2010/0125409 A1 May 20, 2010

(51) Int. Cl.
*G01C 21/00* (2006.01)
*G08G 1/123* (2006.01)

(52) U.S. Cl.
USPC ........... 701/450; 701/400; 701/408; 701/409; 701/453; 701/466; 340/995.24; 340/995.14; 340/995.16; 340/995.18; 340/995.23

(58) Field of Classification Search
USPC ................. 701/201, 202, 205–210, 400, 408, 701/409, 410, 411, 416, 426, 433, 438, 445, 701/450, 454, 466, 467; 340/990, 995, 995.1, 340/995.14–995.19, 995.21–995.28
See application file for complete search history.

(56) References Cited

U.S. PATENT DOCUMENTS

| | | | | |
|---|---|---|---|---|
| 6,418,373 | B1 * | 7/2002 | Omi et al. | 701/411 |
| 8,024,114 | B2 * | 9/2011 | Doyle | 701/417 |
| 2002/0075323 | A1 * | 6/2002 | O'Dell | 345/835 |
| 2002/0152025 | A1 | 10/2002 | Shimada | |
| 2002/0156572 | A1 | 10/2002 | Bullock et al. | |
| 2003/0179133 | A1 * | 9/2003 | Pepin et al. | 342/357.08 |
| 2005/0102098 | A1 | 5/2005 | Montealegre et al. | |
| 2006/0229806 | A1 * | 10/2006 | Forlenza et al. | 701/207 |
| 2008/0059055 | A1 | 3/2008 | Geelen et al. | |
| 2008/0065325 | A1 | 3/2008 | Geelen et al. | |
| 2009/0187342 | A1 | 7/2009 | Vavrus et al. | |
| 2009/0326798 | A1 * | 12/2009 | Insolia et al. | 701/201 |
| 2010/0179755 | A1 * | 7/2010 | Kohno et al. | 701/208 |

FOREIGN PATENT DOCUMENTS

WO   WO 2005/121707 A2   12/2005

OTHER PUBLICATIONS

International Search Report and Written Opinion, PCT/FI2009/050693, Nov. 11, 2009, pp. 1-19.

\* cited by examiner

*Primary Examiner* — Rami Khatib
(74) *Attorney, Agent, or Firm* — Ditthavong Mori & Steiner, P.C.

(57) ABSTRACT

A method, apparatus, system, and computer program product are disclosed for creating and displaying shortcuts and landmarks on a navigational map. The embodiments include storing context data in a mobile wireless device, the context data including at least one of travel class of a shortcut path, limits of a shortcut path, or restrictions of a shortcut path. The shortcuts may be categorized by their context in travel classes such as car, bike, pedestrian, pram, wheelchair, walker, blind pedestrian, disabled pedestrian, or the like. The embodiments register in the mobile wireless device a starting location for a shortcut path and record locations of the device as the device moves along the shortcut path. The embodiments receive signals describing a landmark at a landmark location along the shortcut path, including digital photographs, descriptive text and voice clips. The embodiments then form in a shortcut mapping file the recorded shortcut path, information about the landmark, and the context data.

10 Claims, 23 Drawing Sheets

Fig. 8C

| CONTEXT DATA RECORD 175C |
|---|
| STARTING LOCATION - XS,YS |
| DESTINATION LOCATION: XD2,YD2 |
| SHORTCUT ID - 170C |
| TRAVEL CLASS: PEDESTRIAN, WHEELCHAIR |
| LIMITS: TIMES 0800-1800 WEEKDAYS |
| RESTRICTIONS: NONE / DISTANCE: 500 meters |
| NAVIGATION MAP: 180 |
| POINTER TO NAVIGATION MAP FILE: 182 |
| POINTER TO SHORTCUT FILE: 172C |
| POINTER TO DESCRIPTIVE TEXT :190C |

| DESCRIPTIVE TEXT 190C |
|---|
| TRAVEL CLASS: PEDESTRIAN, WHEELCHAIR |
| LIMITS: TIMES 0800-1800 WEEKDAYS |
| RESTRICTIONS: NONE / DISTANCE: 500 meters |
| STARTING LOCATION - XS,YS |
| DIRECTION_1: USE GPS OUTSIDE OF BUILDING |
| DIRECTION_2: GO TO WEST SIDE OF BUILDING |
| DIRECTION_3: ENTER WEST SIDE OF BUILDING |
| DIRECTION_4: USE WLAN INSIDE BUILDING |
| LANDMARKS: (XL1,YL1) STATUE IN CENTRAL HALL |
| DIRECTION_5: TURN LEFT AT STATUE |
| WLAN AP: (XW1,YW1) AP AT NORTH DOOR |
| DIRECTION_6: GO TO NORTH DOOR |
| DIRECTION_7: USE GPS OUTSIDE OF BUILDING |
| DIRECTION_8: GO WEST & CROSS AT CORNER |
| DESTINATION LOCATION: XD2,YD2 |

NAVIGATION MAP 180

START XS,YS
SHORTCUT PATH 170C
STAIRS
WLAN AP XW1,YW1
SECOND DESTINATION XD2,YD2
X0,Y0
FIRST DESTINATION XD1,YD1
LANDMARK (FLAG) XL2,YL2
LANDMARK (STATUE) XL1,YL1
WLAN AP XW2,YW2
STAIRS

USER GENERATED PEDESTRIAN AND INDOOR SHORTCUT ROUTES FOR NAVIGATION SYSTEMS

FIELD

The embodiments relate to enabling users to record and retrieve shortcuts in a navigation system.

BACKGROUND

Current navigation systems are optimized for cars, not pedestrians. Pedestrians can often take routes which are not possible by car, e.g. indoors or small paths which are not easily visible on maps. In some cases, e.g. city centers, pedestrian maps also show paths for pedestrians, but this is not widely available in many areas. Even further, this typically does not include indoor shortcuts. This means that most of current map data is only suitable for outdoors and routes are only complete for car travel using GPS receivers. Moreover, GPS signals are adversely affected by multipath delay of the GPS radio signals when they are reflected off surrounding terrain; buildings, canyon walls, urban streets, hard ground, etc. Because GPS signals have a very low power level when they reach the Earth's surface, they are almost completely attenuated inside buildings.

Even though navigation data has become very comprehensive, one cannot assume that all possible pedestrian shortcuts are included in current navigation systems. It would be useful to enable pedestrians and others to create navigation data for their own use. Additionally, existing navigation systems are not operational for indoor use.

SUMMARY

A method, apparatus, system, and computer program product are disclosed for creating and displaying shortcuts and landmarks on a navigational map. The embodiments include storing context data in a mobile wireless device, the context data including at least one of travel class of a shortcut path, limits of a shortcut path, or restrictions of a shortcut path. The embodiments register in the mobile wireless device a starting location for a shortcut path and record locations of the device as the device moves along the shortcut path. The embodiments receive signals describing a landmark at a landmark location along the shortcut path, including digital photographs, descriptive text and voice clips. The embodiments then form in a shortcut mapping file the recorded shortcut path, information about the landmark, and the context data.

Embodiments store in a database in a server a navigation map file including a navigation map encompassing a mapped location at a map coordinate, the navigation map file to be accessible in the database using as a search term the map coordinate and context data including at least one of travel class of a shortcut path, limits of a shortcut path, or restrictions of a shortcut path. The embodiments receive in the server a shortcut mapping file including a recorded shortcut path having the context data and a starting location at the map coordinate and store in the database in the server the shortcut mapping file to be accessible in the database using the context data and the map coordinate as a search term. The embodiments may then receive in the server a database query using the context data and the map coordinate as a search term and, in response, access from the database the navigation map file and the shortcut mapping file. The embodiments may merge the shortcut mapping file with the navigation map file in the server.

The embodiments allow users to add shortcut routes for pedestrians and indoor uses to existing navigational maps for both indoor and outdoor use. These shortcuts may be categorized by their context in travel classes such as car, bike, pedestrian, pram, wheelchair, blind pedestrian, disabled pedestrian, or the like. The shortcuts may then be used by other users, who have the opportunity to edit the recorded shortcut description and add landmarks or other descriptions, to improve its usefulness.

DESCRIPTION OF THE FIGURES

FIG. 8C is a third example of a shortcut path through the building of FIG. 8A, with the corresponding context data record and descriptive text for the third shortcut path.

DISCUSSION OF EXAMPLE EMBODIMENTS OF THE INVENTION

Figure 1:
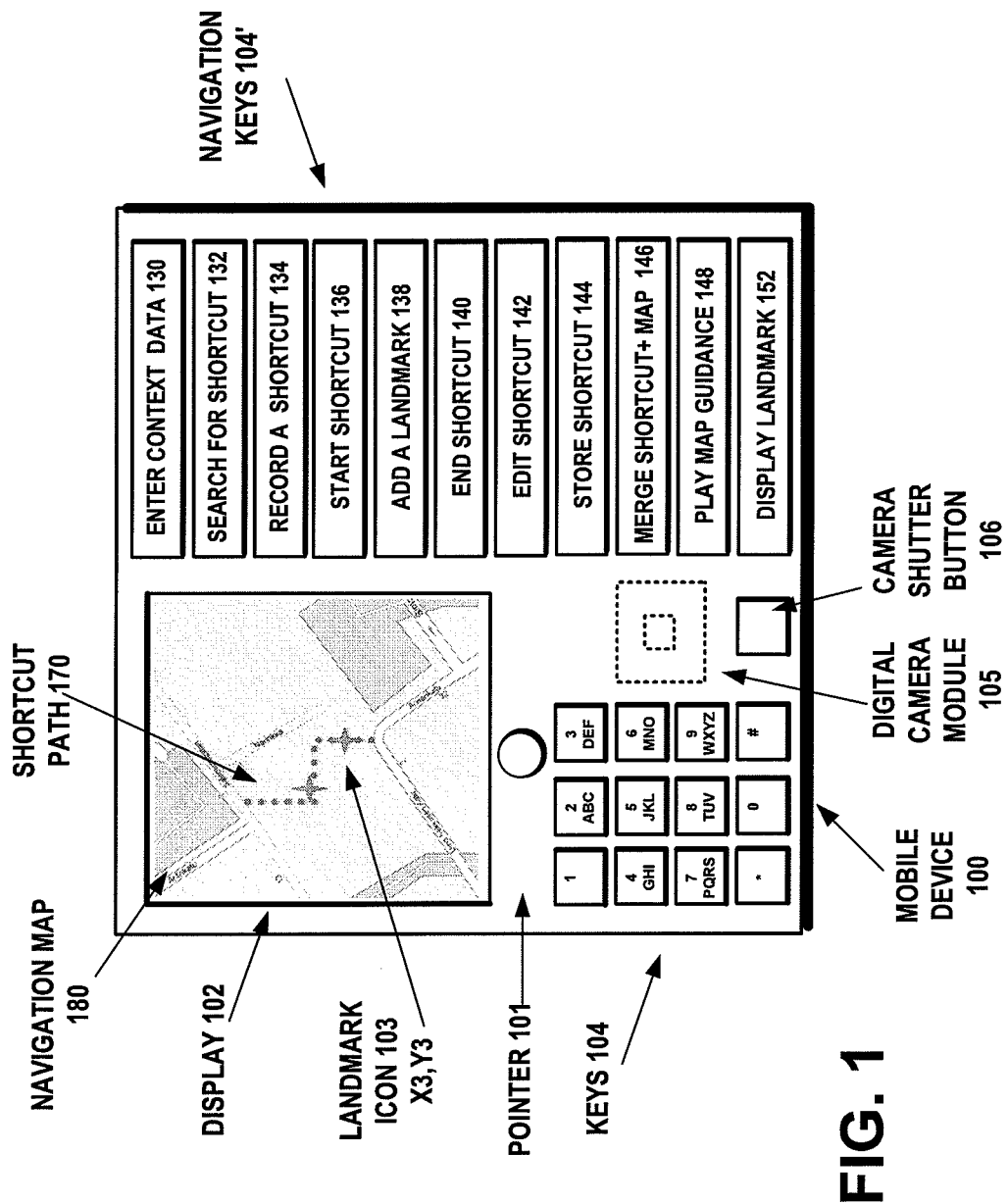
FIG. 1 is an external view of an example embodiment of the mobile wireless device displaying a digital navigation map with a shortcut path depicted, and a plurality of navigation keys provided on the device to create, store, and display shortcut paths on navigation maps.

FIG. 1 is an external view of an example embodiment of the mobile wireless device 100 displaying on display 102 a digital navigation map 180 with a shortcut path 170 and a landmark icon 103 depicted at location coordinates X3,Y3. The mobile wireless device 100 includes a pointer 101, a key pad 104, a digital camera 105, and a camera shutter button 106. The pointer 101 may be a track ball, arrow keys, touch pads, or the like. A plurality of navigation keys 104' provided on the device to create, store, and display shortcut paths on navigation maps. The navigation keys include Enter Context Data key 130, Search For Shortcut key 132, Record A Shortcut key 134, Start Shortcut key 136, Add A Landmark key 138, End Shortcut key 140, Edit Shortcut key 142, Store Shortcut key 144, Merge Shortcut & Map key 146, Play Map Guidance key 148, and Display Landmark key 152.

The user may enter context data in the mobile wireless device 100 by pressing the Enter Context Data key 130 and then typing in the context data, to be used in obtaining the navigational directions provided by the device. The context data may include the user's preferences for travel class of shortcut paths that the user is willing or able to traverse. The user may enter travel classes such as car, bike, pedestrian, pram, wheelchair, walker, blind pedestrian, disabled pedestrian, or the like. The context data may include the user's preferences for limits on using a shortcut path, such as particular dates or times when the user is likely to need to traverse such paths. If the user is a member of a particular group, such as being an employee of a company, the user may enter context data for such restrictions, if a shortcut path is likely to include passage through the company's property. The context data entered by the user is stored in the memory of the mobile wireless device 100.

In example embodiments, the mobile wireless device 100 includes a digital camera for taking photographs. When the shutter button of the digital camera is actuated and a digital image or object is captured by the camera and stored in a digital image file, the control module of the mobile wireless device determines the current location of the device with respect to a plurality of wireless access points having known geographic locations. In example embodiments, the digital image or object can be post-processed to determine what the location of the device was with respect to the plurality of wireless access points.

Figure 1A:
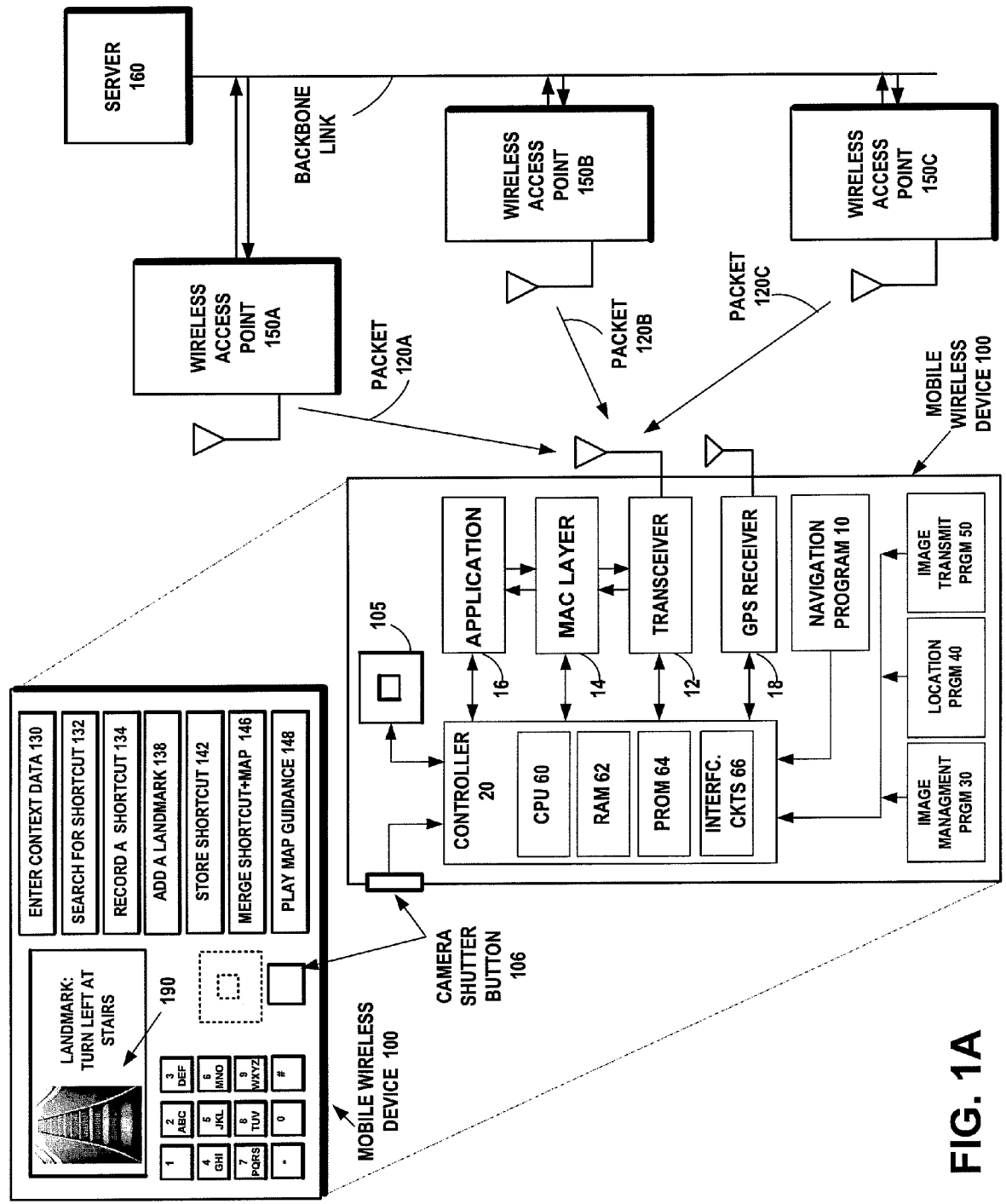
FIG. 1A illustrates an external view and a functional block diagram of an example embodiment of the mobile wireless device of FIG. 1 programmed with a navigation program, the device displaying a landmark photographed by the user along the shortcut path, FIG. 1A further showing a wireless access point network connected to a server.
Figure 1B:
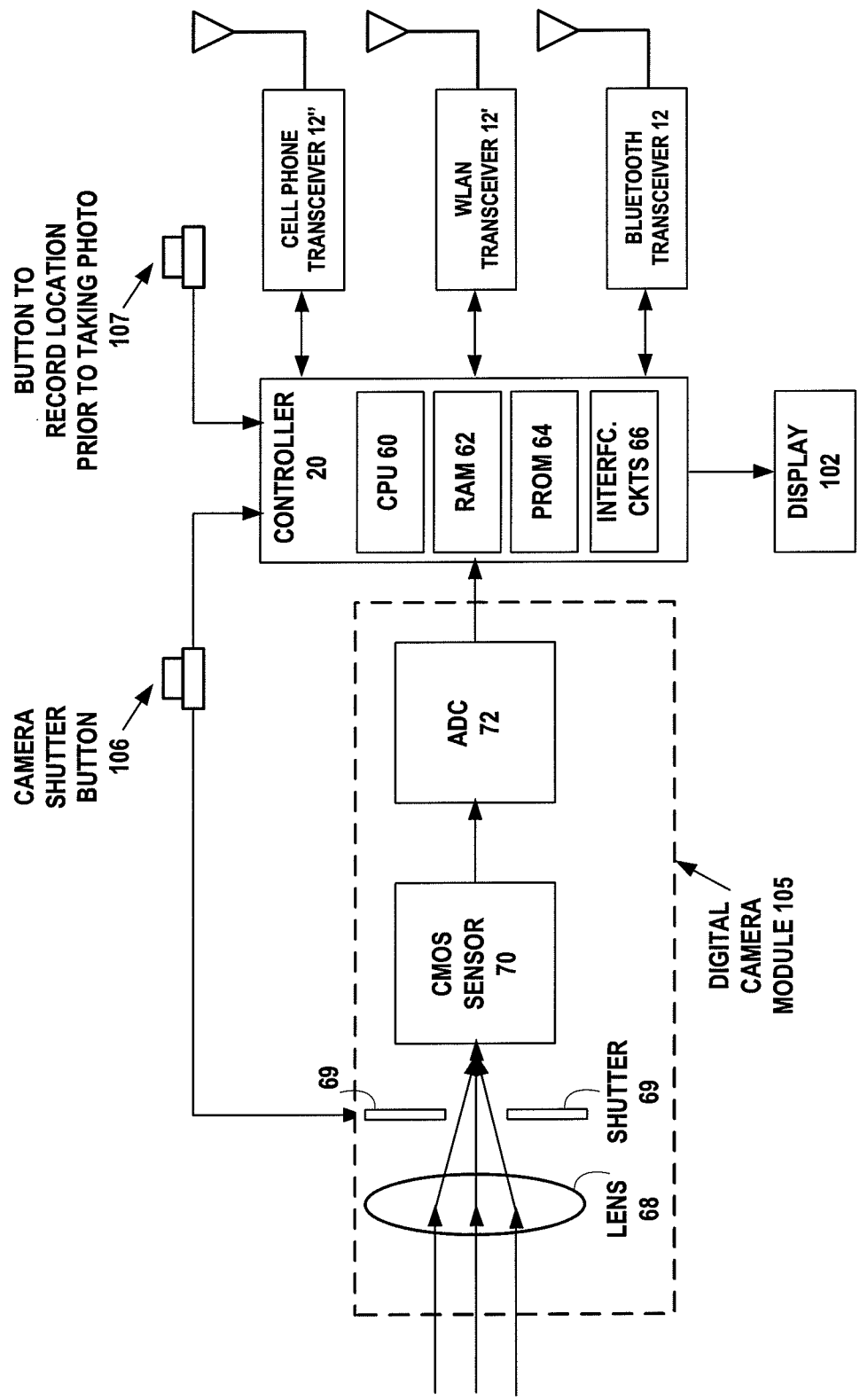
FIG. 1B illustrates a functional block diagram of an example embodiment of the mobile wireless device of FIG. 1A, showing a digital camera module and three wireless transceivers.

FIG. 1A illustrates an external view and a functional block diagram of an example embodiment of the mobile wireless device 100 equipped with the plurality of navigation keys 104'. The figure shows a network of wireless access points 150A, 150B, and 150C. The mobile wireless device 100 can be a mobile communications device, personal digital assistant (PDA), cell phone, pager, laptop computer, or palmtop computer, or the like. The mobile wireless device 100 can also be an integrated component of a vehicle, such as an automobile, bicycle, airplane or other mobile conveyance. FIG. 1B illustrates a functional block diagram of an example embodiment of the mobile wireless device 100 of FIG. 1A, showing the digital camera module 105 in more detail, the display 102, and further showing three wireless transceivers 12, 12' and 12". The transceivers are transceivers that include both a transmitter and a receiver operating using the wireless network protocol. Transceiver 12 may operate using a wireless wide area network (WWAN) protocol operating, for example, under a cellular telephone network protocol, and transceiver 12' may operate using a wireless local area network (WLAN) protocol or a wireless personal area network (WPAN) protocol. The third transceiver 12" may operate under a personal area network protocol such as the Bluetooth or IEEE 802.15 protocol.

The mobile wireless device 100 includes the digital camera module 105, which includes a lens 68, an electric shutter 69, a CMOS sensor 70, and an analog to digital converter (ADC) 72. The lens 68 converges incident light on the CMOS sensor 70. The electric shutter 69 may be an electromechanical or electro-optical shutter that is opaque to the incident light until actuated by the shutter button 106. The CMOS sensor 70 may be an RGB color filter that converts incident light into electric signals representing red, green, and blue light components. Images are captured by actuating the shutter button 106 to open the electric shutter 69, which exposes the CMOS sensor 70 to incident light refracted through the lens 68. The electric signals representing red, green, and blue light output by the CMOS sensor 70 are converted to digital image or object signals by the analog to digital converter 72 and output to the controller 20. The image sensor 70 may comprise a different type of sensor, such as a charge coupled device (CCD). The digital camera module 105 may be mounted anywhere on the device 100, for example on the front side of the device 100 or connected to the device 100 via a cable or via a Bluetooth or other wireless personal area network (WPAN) link.

The controller 20 can further process the digital image or object signals from the analog to digital converter 72, forming a digital image file by compressing the digital image using the Joint Photographic Experts Group (JPEG) compression algorithm or other compression algorithms and performing other image processing operations on the image file before storing the image file in the RAM 62. The digital camera module 105 may also record motion pictures by periodically capturing a sequence of digital images, for example at thirty images per second, and the controller 20 can further process the sequence as compressed JPEG files or Moving Picture Experts Group (MPEG) files or in another format and store them in the RAM 62.

In example embodiments, the method can perform the step of determining a current location for the wireless device, for example, by analyzing received signals from each of the plurality of access points 150A, 150B, and 150C, to obtain a distance value from the wireless device to each of the plurality of access points. The method can then calculate a relative position of the wireless device with respect to the plurality of access points. The method can then access absolute or estimated positioning information, such as geographic coordinates, of each of the plurality of wireless access point devices and combine the relative position of the wireless device with the absolute or estimated positioning information of the plurality to obtain an absolute or estimated position of the wireless device, such as its own geographic coordinates.

The mobile wireless device 100 and the wireless access points 150A, 150B, and 150C communicate in a wireless network that can be a wireless personal area network (WPAN) operating, for example, under the Bluetooth or IEEE 802.15 network protocol. The wireless network can be a wireless local area network (WLAN) operating, for example under the IEEE 802.11, Hiperlan, WiMedia Ultra Wide Band (UWB), WiMax, WiFi, or Digital Enhanced Cordless Telecommunications (DECT) network protocol. Or, the wireless network can be a wireless wide area network (WWAN) operating, for example, under a cellular telephone network protocol, for example Global System for Mobile (GSM), General Packet Radio Service (GPRS), Enhanced Data rates for GSM Evolution (EDGE), Code Division Multiple Access (CDMA), Universal Mobile Telecommunications System (UMTS) and CDMA2000. The respective wireless network protocols include provision for communication by the mobile wireless device 100 in the network with the wireless access points 150A, 150B, and 150C by means of the respective protocol data unit (PDU) packets 120A, 120B, and 120C. These examples of wireless network protocols for the device 100 are not meant to be limiting, since it is common for wireless communications protocols to provide for communication between mobile wireless devices and a wired network infrastructure via wireless access points.

Each of these example networks is defined by its respective communications protocol to include the exchange of packets of data and control information between the wireless access point and the mobile wireless devices. Each of the communications protocols defines levels of networking functions and the services performed at each level for the wireless access points and the mobile wireless devices operating using the protocol. Typically, the networking functions include the transmission of packets by the access point having the purpose of announcing its presence to mobile wireless devices within range, either by initiating an inquiry or beacon packet or by responding with a response packet to a probe packet from a mobile device.

The mobile wireless device 100 includes a control module 20, which includes a central processing unit (CPU) 60, a random access memory (RAM) 62, a read only memory (ROM) or programmable read only memory (PROM) 64, and interface circuits 66 to interface with the key pad 104 and navigation keys 104', liquid crystal display (LCD) 102, and the digital camera module 105. The device 100 may also include a microphone, speakers, ear pieces, a video camera, or other imaging devices, etc. The RAM 62 and PROM 64 can be removable memory devices such as smart cards, Subscriber Identity Modules (SIMs), Wireless Application Protocol Identity Modules (WIMs), semiconductor memories such as a RAM, ROM, or PROM, flash memory devices, etc. The Medium Access Control (MAC) Layer 14 of the network protocol of the wireless device and/or application program 16 can be embodied as program logic stored in the RAM 62 and/or PROM 64 in the form of sequences of programmed instructions which can be executed in the CPU 60, to carry out the functions of the disclosed embodiments. The program logic can be delivered to the writeable RAM, PROM, flash memory device, etc. 62 of the device 100 from a computer program product or article of manufacture in the form of computer-usable media such as resident memory devices, smart cards or other removable memory devices, or in the form of program logic transmitted over any transmitting medium which transmits such a program. Alternately, the MAC Layer 14 and/or application program 16 can be embodied as integrated circuit logic in the form of programmed logic arrays or custom designed application specific integrated circuits (ASIC). The transceivers 12, 12', and 12" in device 100 operate in accordance with the network protocols of the wireless device.

The navigation program 10 in device 100 enables the controller 20 to process user inputs to the navigation keys 104' of FIG. 1. The flow diagrams of FIGS. 2A to 2G, discussed below, are an example embodiment of the navigation program 10 performing example steps when a user selects some of the navigation keys 104' of FIG. 1.

The image management program 30 in device 100 enables the controller 20 to process the digital image signals forming a digital image file by compressing the digital image using the JPEG compression algorithm or other compression algorithms and enables the controller to perform other image processing operations on the image file and stores the image file in the RAM 62. The image management program 30 also enables the controller 20 to process sequences of digital images in a moving picture as compressed JPEG files or MPEG files or another format and stores them in the RAM 62. The image management program 30 can be embodied as program logic stored in the RAM 62 and/or PROM 64 in the form of sequences of programmed instructions which can be executed in the CPU 60, carry out the functions of the disclosed embodiments.

The relative positioning method may perform a calculation, for example, based on signal strengths, wherein distances are related to the respective signal strengths. The relative positioning method may also perform triangulation based on the direction of the signal. The relative positioning method may also perform triangulation based on both direction and signal strength. Other relative positioning methods can include a proximity algorithm or other deterministic algorithms. The relative positioning method may be by pattern recognition of the received signals, matching the received pattern with stored patterns that are associated with known geographic locations, in a technique known as "fingerprinting".

The location information can include geographic coordinates and names of places and things near the device's current location. The location information may be stored in the digital image file of the device as embedded data along with the stored digital image or other object. The photographs may then be displayed on the user's device or wirelessly transmitted by the device. The embodiments are especially useful for photographs taken indoors or nearby tall buildings where GPS signals are distorted or not available.

The location program 40 in device 100 enables the controller 20 to determine a current relative position of the device 100 with respect to the plurality of wireless access point devices 150A, 150B, and 150C. The location program 40 can calculate relative positions of the device 100 based on received signal strengths, triangulation based on the direction of the received signal, triangulation based on both direction and signal strength of received signals, and other relative positioning methods such as proximity algorithms or other deterministic algorithms. The location program 40 can calculate relative positions of the device 100 based on pattern recognition of the received signals, matching the received pattern with stored patterns that are associated with known geographic locations, in a technique known as "fingerprinting". Pattern data is collected on an access point observed at a location and this pattern data is later processed to find a match with a corresponding reference pattern for that location out of many possible reference patterns for locations. The location program 40 can be embodied as program logic stored in the RAM 62 and/or PROM 64 in the form of sequences of programmed instructions which can be executed in the CPU 60, carry out the functions of the disclosed embodiments.

The image transmit program 50 in device 100 enables the controller 20 to upload shortcut mapping files or objects, navigation map files or objects, geographic location data, and digital image, text, or voice clip objects and wirelessly transmit them to other mobile wireless devices or to a wireless access point, for example access point 150A. The image transmit program 50 can be embodied as program logic stored in the RAM 62 and/or PROM 64 in the form of sequences of programmed instructions which can be executed in the CPU 60, carry out the functions of the disclosed embodiments.

The mobile wireless device 100 of FIG. 1A includes a Global Positioning System (GPS) receiver 18, which can establish the latitude and longitude coordinates of the device 100. The GPS receiver calculates its position using highly accurate time reference signals from the GPS satellite navigation system's constellation of orbiting satellites. The GPS receiver 18 obtains a current latitude and longitude of the device 100 during the device's motion along various paths represented on the navigation map 180. Although latitude in degrees north or south of the Earth's equator and longitude in degrees west of the Greenwich prime meridian are the positional units conventionally output by GPS modules, other positional units may be provided. The current location provided by GPS modules can in units of the Universal Transverse Mercator (UTM) coordinate system, which is a grid-based method of specifying locations on the surface of the Earth. Another positional unit that can be provided by a GPS module is in the Military Grid Reference System (MGRS), which is the geographic standard used by NATO militaries for locating any point on the earth with a 2 to 10 character geocode. GPS signals can be adversely affected by multipath delay of the GPS radio signals when they are reflected off surrounding terrain; buildings, canyon walls, urban streets, hard ground, etc.

The mobile wireless device 100 of FIG. 1B may have at least three wireless transceivers 12, 12' and 12". One of the transceivers 12" may be, for example, a cellular telephone transceiver operating under example network protocols such as GSM, GPRS, EDGE, CDMA, UMTS or CDMA2000. Detection of the device's location may be performed using triangulation between plural cellular telephone base stations or recognition of cell IDs in a cellular telephone network. The cellular telephone base stations have a communication range of several kilometers.

The second transceiver 12' of FIG. 1B may be, for example, a wireless LAN transceiver operating under example network protocols such as IEEE 802.11, Hiperlan, WiMedia UWB, WiMax, WiFi, or DECT. Detection of the device's location may be performed using triangulation between plural wireless LAN access points. The wireless LAN access points have a communication range of approximately one hundred meters.

The third transceiver 12 of FIG. 1B may operate under a personal area network (PAN) protocol such as the Bluetooth or IEEE 802.15 protocol. Detection of the device's location may be performed based on proximity to a PAN access point. The personal area network (PAN) access points have a communication range of approximately ten meters.

FIG. 1A further illustrates a backbone network for the access points 150A, 150B, and 150C. The access points 150A, 150B, and 150C may be mobile or fixed and each can know its own geographic location. If an access point is mobile, it may know its own geographic location when it is currently stationary, for example, by receiving packets from other access points with known geographic locations. Alternately, a mobile access point may know its own geographic location by means of a Global Positioning System (GPS) sensor. If the access points 150A, 150B, and 150C are fixed, they may be connected over the backbone link of FIG. 1A to the backbone server 160. The server 160 can maintain a database 620 of geographic coordinate location data, which represents the absolute or estimated position for each of the access points 150A, 150B, and 150C.

The device 100 can include a map buffer in RAM 62 for storing map display data, including cartographic information for the current latitude and longitude of the navigation device 100. The location program 40 in the RAM 62 processes the map display data and cartographic information for the current latitude and longitude to render the map display in the display 102. The user can connect the navigation device 100 through the WLAN transceiver 12' or cellular transceiver 12" to the server 160 shown in FIG. 1A, to download map data. The map data can also be downloaded through an I/O port (not shown) from the user's personal computer (PC) reading the data from a compact disk read-only memory (CDROM) or a digital video disk (DVD) storage medium. The map buffer in the device 100 can also be embodied as a disk, optical disk, removable memory device such as a smart card, SIM, WIM, or a semiconductor memory such as RAM, ROM, PROM, etc. Optionally, the device 100 can communicate through the cellular telephone transceiver 12" to the server 160 to remotely perform the functions of the navigation application.

Pressing the setup button 107 on the mobile wireless device 100 of FIG. 1B, separate from the shutter button 106, activates the location program 40 to determine the current location for the mobile wireless device 100 with respect to a plurality of wireless access points 150A, 150B, and 150C. The location program 40 stores the calculated absolute or estimated position of the device 100 as data in the calculated position buffer 302 of the RAM 62 of FIG. 3. Then later, when the shutter button 106 is activated and the photograph is taken at that location, the image management program 30 is executed to process the captured digital image signals, forming a digital image file 304, which it stores in the RAM 62 of FIG. 3.

Figure 2:
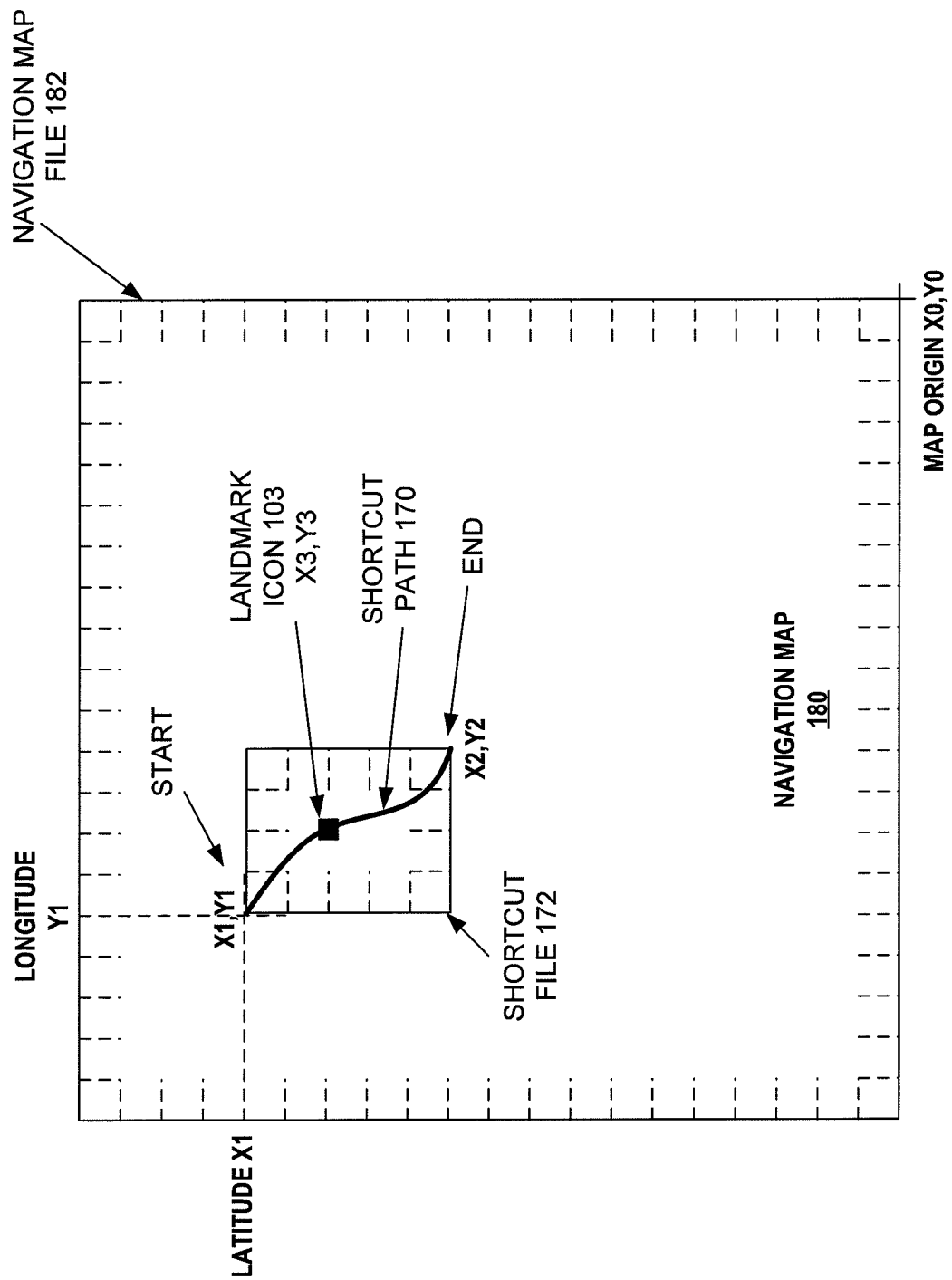
FIG. 2 illustrates an example navigation map file and a shortcut file with their common map coordinates juxtaposed.

FIG. 2 illustrates an example navigation map file 182 and a shortcut file 172 with their common map coordinates $X1,Y1$ and $X2,Y2$ juxtaposed. The map coordinates $X1,Y1$ and $X2,Y2$ may be latitude and longitude values referenced with respect to the Earth's equator and the Greenwich prime meridian, respectively. The images displayed on the navigation map 180 and the shortcut path 170 may be represented as bit mapped objects, vector graphics objects, or algorithmically generated objects that are rendered by the image management program 30 to generate the lines and shapes rendered for display on the display 102.

The shortcut path 170 is displayed on the navigation map 180 by juxtaposing the starting location $X1,Y1$ and the ending location $X2,Y2$ of the shortcut path 170 with the same respective map coordinates of the navigation map 180 with respect to the origin $X0,Y0$ of the navigation map 180 in the mapping coordinate system. The map coordinates $X0,Y0$ may be latitude and longitude values referenced with respect to the Earth's equator and the Greenwich prime meridian, respectively. As would be well understood by those of ordinary skill in the art, the data for the position of the device can be represented in any of the various mapping coordinate systems such as, for example, the World Geodetic System 1984 (WGS-84) and the North American Datum (NAD). A description of the World Geodetic System 1984 was published by National Imagery and Mapping Agency, *Department of Defense World Geodetic System* 1984: *Its Definition and Relationships with Local Geodetic Systems*, NIMA TR8350.2, Third Edition, 4 Jul. 1997, Bethesda, Md., which is incorporated herein by reference. A description of the North American Datum (NAD) was published by Charles R. Schwarz, *North American Datum of* 1983, Rockville, Md.: National Geodetic Survey, 1989, which is incorporated herein by reference.

A landmark icon 103 representing a landmark at location $X3,Y3$ on the shortcut path 170 may represent a photograph, text, or a voice clip describing the actual landmark. The landmark icon is located at $X3,Y3$ with respect to the origin $X0,Y0$ of the navigation map 180 in the mapping coordinate system. The map coordinates $X3,Y3$ may be latitude and longitude values referenced with respect to the Earth's equator and the Greenwich prime meridian, respectively. The landmark icon 103 may be embodied as an element in the shortcut file 172. The landmark icon 103 is selectable by a user with the pointer 101 and is associated with a target photograph, text, or a voice clip object 190 in such a way that the target object 190 is executed or displayed upon selection of the selectable landmark icon 103. When the user selects the landmark icon 103 at location $X3,Y3$ on the shortcut path 170, the target photograph, text, or a voice clip object 190 describing the landmark is displayed or played. The recorded shortcut path 170, the landmark photograph, text, or a voice clip object 190, and the navigation map 180 are contained in the navigation map file 182.

Figure 2A:
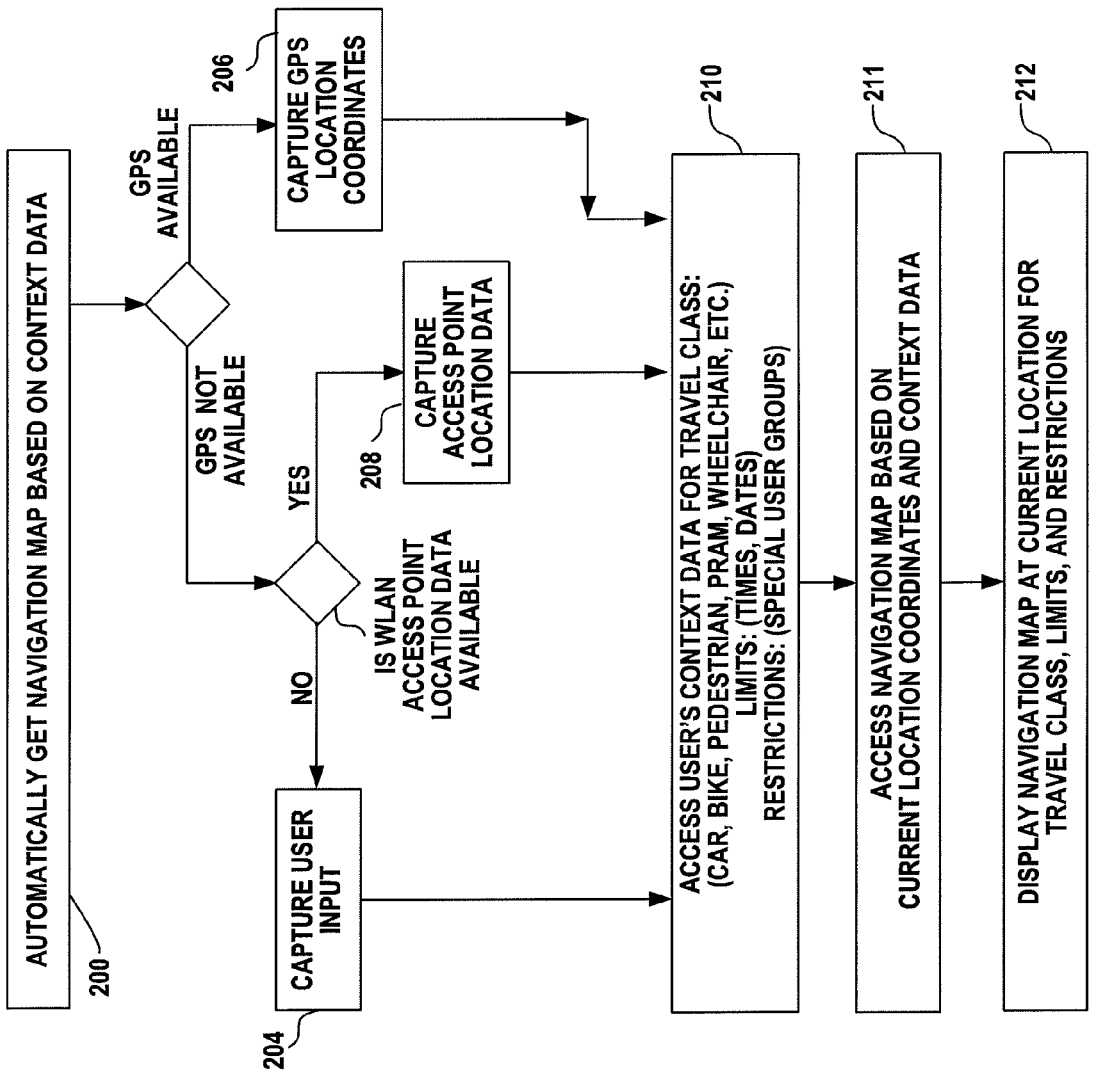
FIG. 2A is a flow diagram of an example embodiment a portion of the navigation program of the mobile wireless device of FIG. 1 performing example steps to automatically get a navigation map based on context data, accessed from a pre-installed map in the memory of the device or from the server.

FIG. 2A is a flow diagram of an example embodiment a portion of the navigation program 10 of the mobile wireless device 100 of FIG. 1 performing example steps 200 to automatically get a navigation map 180 based on context data, accessed from a pre-installed map in the RAM or PROM memory of the device 100 or from the server 160. The pre-installed map in the device 100 may be embodied in a disk, optical disk, removable memory device such as a smart card, SIM, WIM, or a semiconductor memory such as RAM, ROM, PROM, etc. A decision is made whether GPS location coordinates are available, which will go to step 206 to get the GPS location data. If GPS coordinates are not available, then a decision is made whether access point location data is available, and if it is then go to step 208 to get the access point location data. This may be from either WLAN access points 150A, 150B, 150C, cellular telephone base stations, or personal area network (PAN) access points. If access point location data is not available, then the procedure flows to step 204 to capture the user's input of location data. The user's inputs in step 204 may include a description of the wireless device's location using text or a voice clip, in the event that neither GPS nor WLAN signals are available. Steps 204, 206, and 208 respectively pass location data to step 210, access user's context data for travel class: (for example, car, bike, pedestrian, pram, wheelchair, blind pedestrian, disabled pedestrian, etc.) limits: (for example, times, dates) restrictions: (for example, special user groups). The procedure then flows to step 211 access navigation map based on current location coordinates and context data. The procedure then flows to step 212 display the navigation map 180 at the current location $X1,Y1$ for travel class, limits, and/or restrictions.

Figure 6:
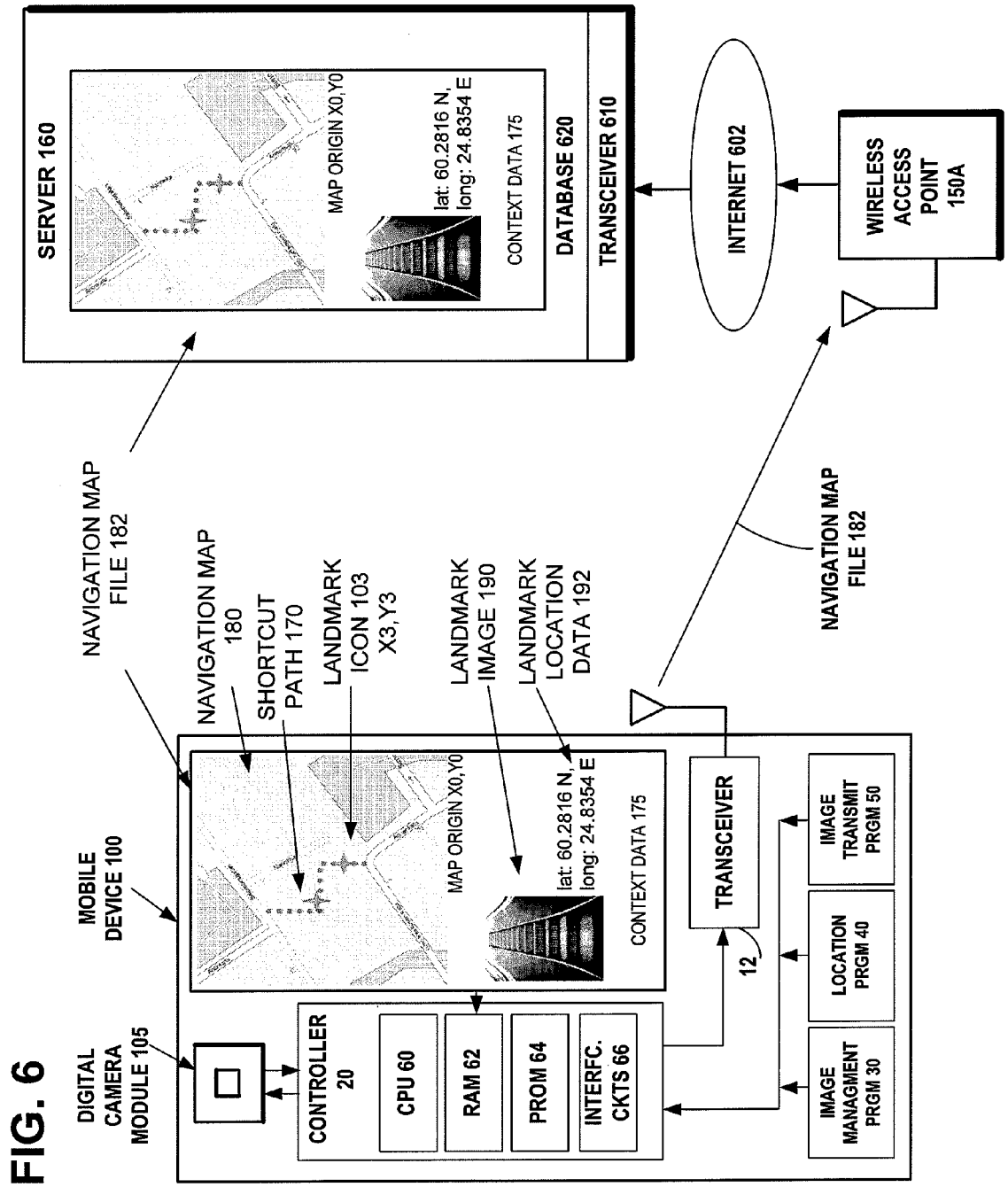
FIG. 6 illustrates a functional block diagram of an example embodiment of the mobile wireless device uploading the navigation map file including context data, the digital image of the photograph of the landmark and the navigation map, via a wireless access point and the Internet, to the server.

In step 208, the locations of the access points may also be obtained from the Internet. Where WiFi or cellular broadband reception is available at the wireless device 100, information on access point and landmark locations may be downloaded from the server 160. FIG. 6 shows the server 160 connected over the Internet 602 to the wireless access point 150A. The wireless access points 150A, B, and C may operate with PAN, WLAN, and cellular telephone protocols to provide locations of the access points and landmarks from the internet using WiFi or cellular broadband.

Figure 2B:
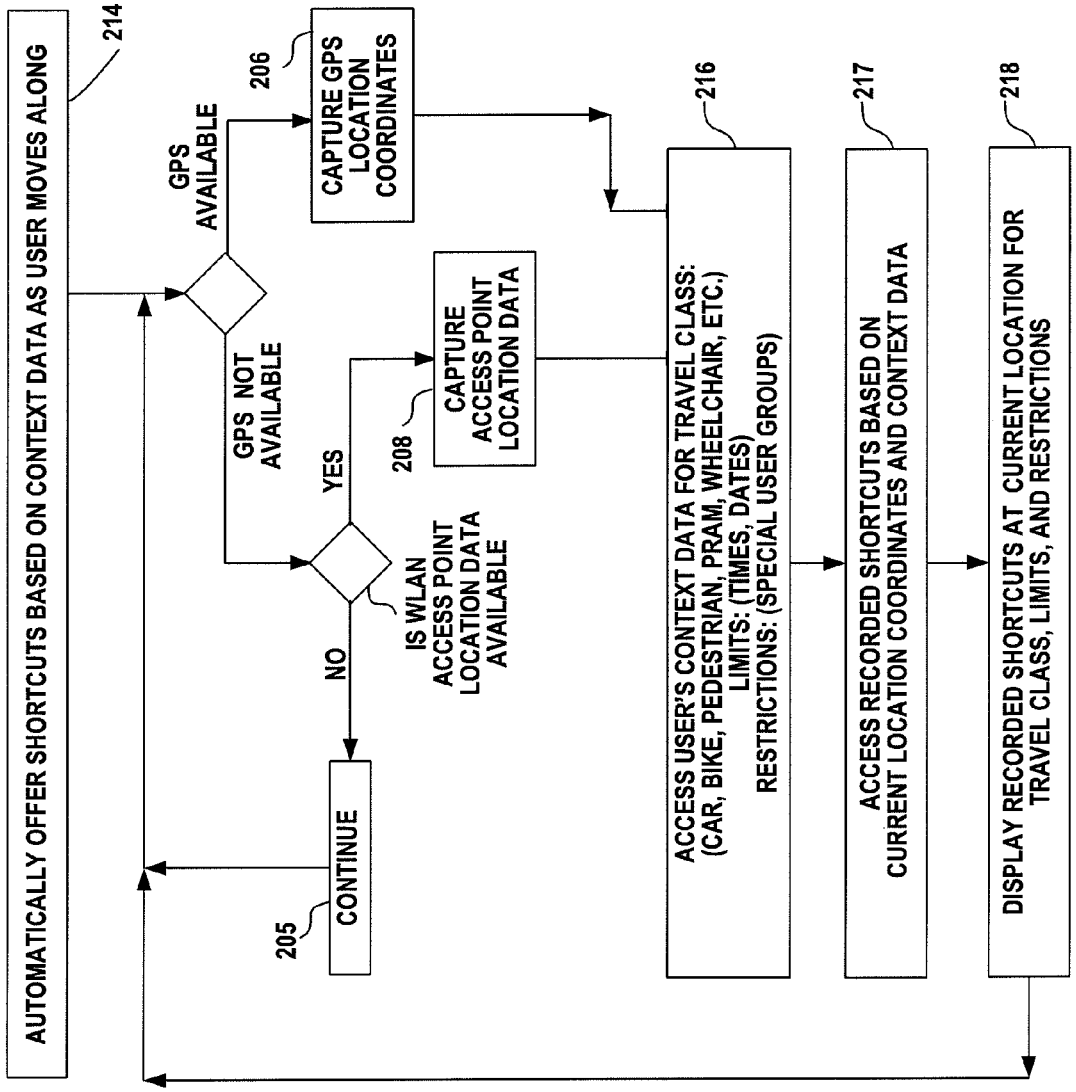
FIG. 2B is a flow diagram of an example embodiment a portion of the navigation program of the mobile wireless device of FIG. 1 performing example steps to automatically offer shortcuts based on context data as user moves along, accessed from shortcuts in the memory of the device or from the server.

FIG. 2B is a flow diagram of an example embodiment a portion of the navigation program 10 of the mobile wireless device 100 of FIG. 1 performing example steps 214 to automatically offer shortcuts based on context data as user moves along, accessed from pre-installed shortcuts in the memory of the device 100 or from the server 160. A decision is made whether GPS location coordinates are available, which will go to step 206 to get the GPS location data. If GPS coordinates are not available, then a decision is made whether access point location data is available, and if it is then go to step 208 to get the access point location data. This may be from either WLAN access points 150A, 150B, 150C, cellular telephone base stations, or personal area network (PAN) access points. If access point location data is not available, then the procedure flows to step 204 to capture the user's input of location data. The user's inputs in step 204 may include a description of the wireless device's location using text or a voice clip, in the event that neither GPS nor WLAN signals are available. Steps 204, 206, and 208 respectively pass location data to step 216 to access user's context data for travel class: (for example, car, bike, pedestrian, pram, wheelchair, blind pedestrian, disabled pedestrian, etc.) limits: (for example, times, dates) restrictions: (for example, special user groups). The procedure then flows to step 217 access recorded shortcuts based on the current location coordinates and context data. The procedure then flows to step 218 display the recorded shortcuts 170 at the current location X1,Y1 for travel class, limits, and/or restrictions.

Figure 2C:
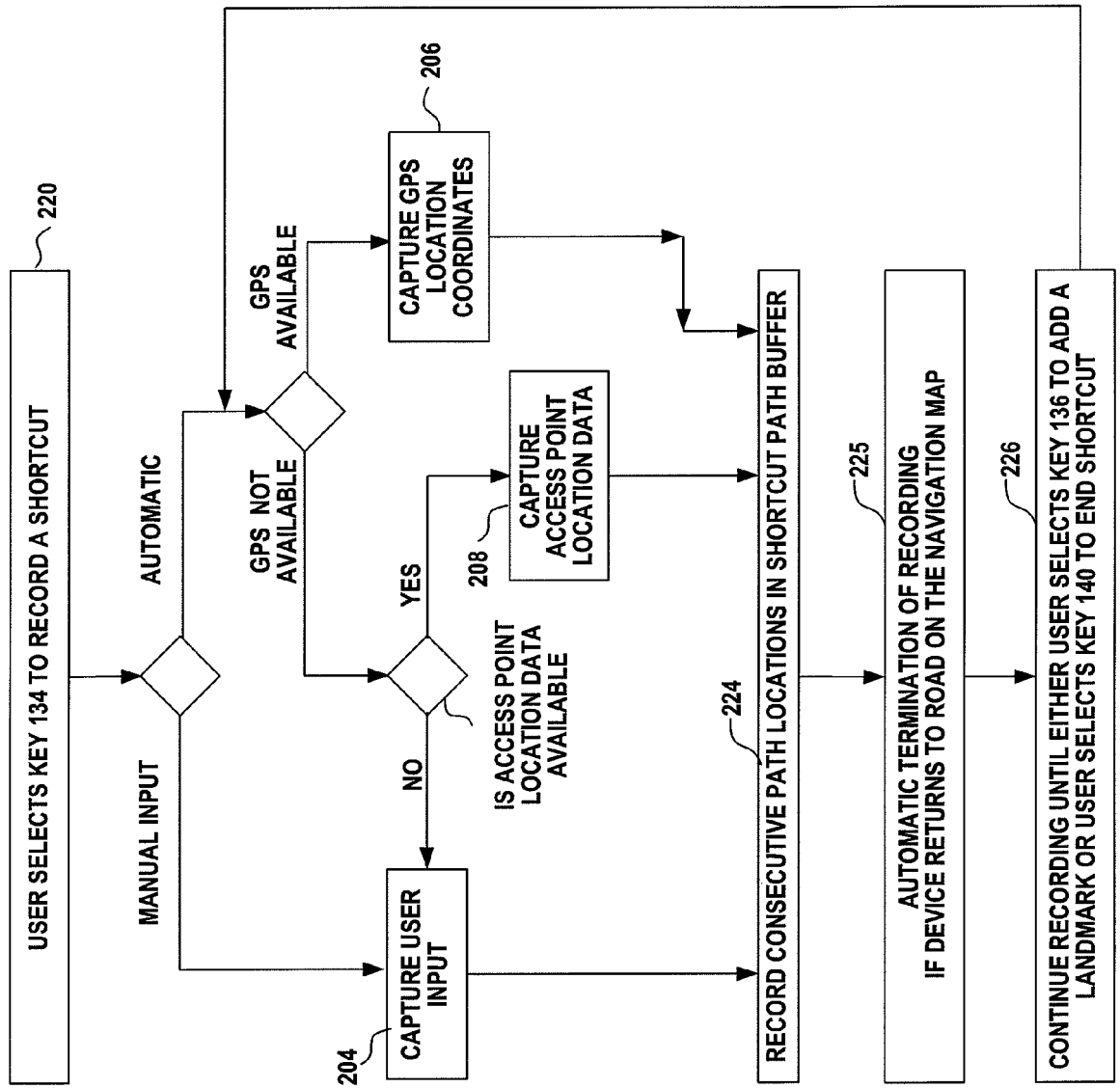
FIG. 2C is a flow diagram of an example embodiment a portion of the navigation program of the mobile wireless device of FIG. 1 performing example steps when a user selects key 134 to record a shortcut while the user is traversing the shortcut path.

FIG. 2C is a flow diagram of an example embodiment a portion of the navigation program 10 of the mobile wireless device of FIG. 1 performing example steps when a user selects key 134 to record a shortcut while the user is traversing the shortcut path 170. In step 220 the user selects the key 134 to record a shortcut by tracking and recording the location of the device 100 at consecutive locations while traversing the shortcut path 170. A decision is made whether the user requests automatic location tracking using GPS or access point signals or whether the user will be manually inputting selected locations along the shortcut path at step 204. If the user requests the device 100 to automatically track the location of the device using GPS or access point signals, a decision is made whether GPS location coordinates are available, which will go to step 206 to get the GPS location data. The procedure may determine whether a GPS signal is available by automatically recognizing from the navigation map or the shortcut map that the device 100 is currently inside a building, since GPS signals are generally not available inside buildings. If GPS coordinates are not available, then a decision is made whether access point location data is available, and if it is then the procedure flows to step 208 to get the access point location data. This may be from either WLAN access points 150A, 150B, 150C, cellular telephone base stations, or personal area network (PAN) access points. If access point location data is not available, the procedure flows to step 204 to manually capture the user's inputs of location data. The user's inputs in step 204 may include a description of the wireless device's location using text or a voice clip, in the event that neither GPS nor WLAN signals are available.

Steps 204, 206, and 208 respectively pass location data to step 224 to record consecutive path locations along the shortcut path 170. The location data may be recorded in a shortcut path buffer to compile the shortcut path file or object 172. In step 225, the procedure may automatically terminate recording the shortcut path 170 if the device 100 returns to a road located on the navigation map, as indicated, for example by the coincidence of their location coordinates. In step 226, recording may continue if step 225 has not been satisfied. The procedure in step 226, loops back to capture more location data at consecutive locations along the shortcut path 170 until either the user selects key 136 to add a landmark or the user selects key 140 to manually end the shortcut.

Figure 2D:
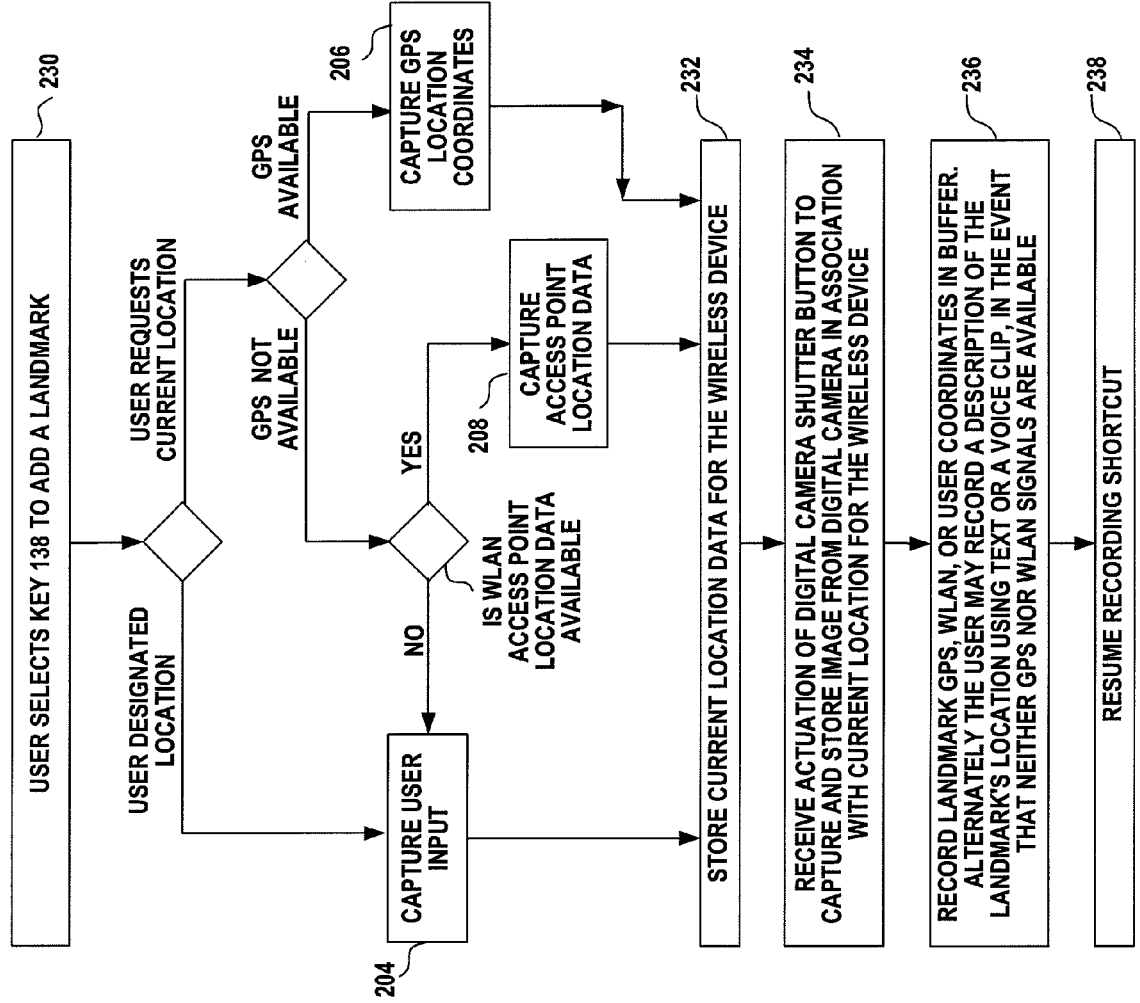
FIG. 2D is a flow diagram of an example embodiment a portion of the navigation program of the mobile wireless device of FIG. 1 performing example steps when a user selects key 138 to add a landmark to the recorded shortcut while the user is traversing the shortcut path.

FIG. 2D is a flow diagram of an example embodiment a portion of the navigation program 10 of the mobile wireless device of FIG. 1 performing example steps when a user selects key 138 to add a landmark to the recorded shortcut while the user is traversing the shortcut path. In step 230 a user selects key 138 to add a landmark to the recorded shortcut while the user is traversing the shortcut path. A decision is made whether the user has selected entering a user designated location, which will go to step 204 to capture the user's input of location data, or whether the user requests the device 100 to determine the current location of the device. If the user requests determining the current location, a decision is made whether GPS location coordinates are available, which will go to step 206 to get the GPS location data. If GPS coordinates are not available, then a decision is made whether access point location data is available, and if it is then go to step 208 to get the access point location data. This may be from either WLAN access points 150A, 150B, 150C, cellular telephone base stations, or personal area network (PAN) access points. If access point location data is not available, then the procedure flows to step 204 to capture the user's input of location data. Steps 204, 206, and 208 respectively pass location data to step 232 to store the current location data for device 100. At step 234, the user may record a photograph of the landmark, the user my type in text with the keypad describing the landmark, or the user may record a voice clip with the microphone in the device 100. To make a photograph, the shutter button of the digital camera is actuated and a digital image of the landmark is captured by the camera and stored as an object 190 in a digital image file. The control module of the device determines the current location of the device along the shortcut path using the GPS signals or the signals from the access points having known geographic locations. In step 236, the landmark GPS, WLAN, or user coordinates are stored in a shortcut path buffer. Alternately in step 236, the user may record a description of the landmark's location using text or a voice clip, in the event that neither GPS nor WLAN signals are available. The recorded shortcut path 170, the recorded landmark photograph, text, or a voice clip object 190, the landmark location data 192, and the navigation map 180 are compiled in the navigation map file 182 shown in FIG. 5B. In step 238, the recording of the shortcut path is resumed.

Occasionally, the coordinates of the location of a landmark are not available and thus this information is omitted from the shortcut path file. The user traversing the path may record a text description or a voice clip to guide future uses of the recorded shortcut information.

Landmarks, such as digital photographs, text, or voice clips, may be received as radio signals at the transceivers 12, 12', or 12". Landmarks may also be PAN or WLAN access points or cellular base stations, which may be identified with icons 103 on the navigational map 180.

Figure 2E:
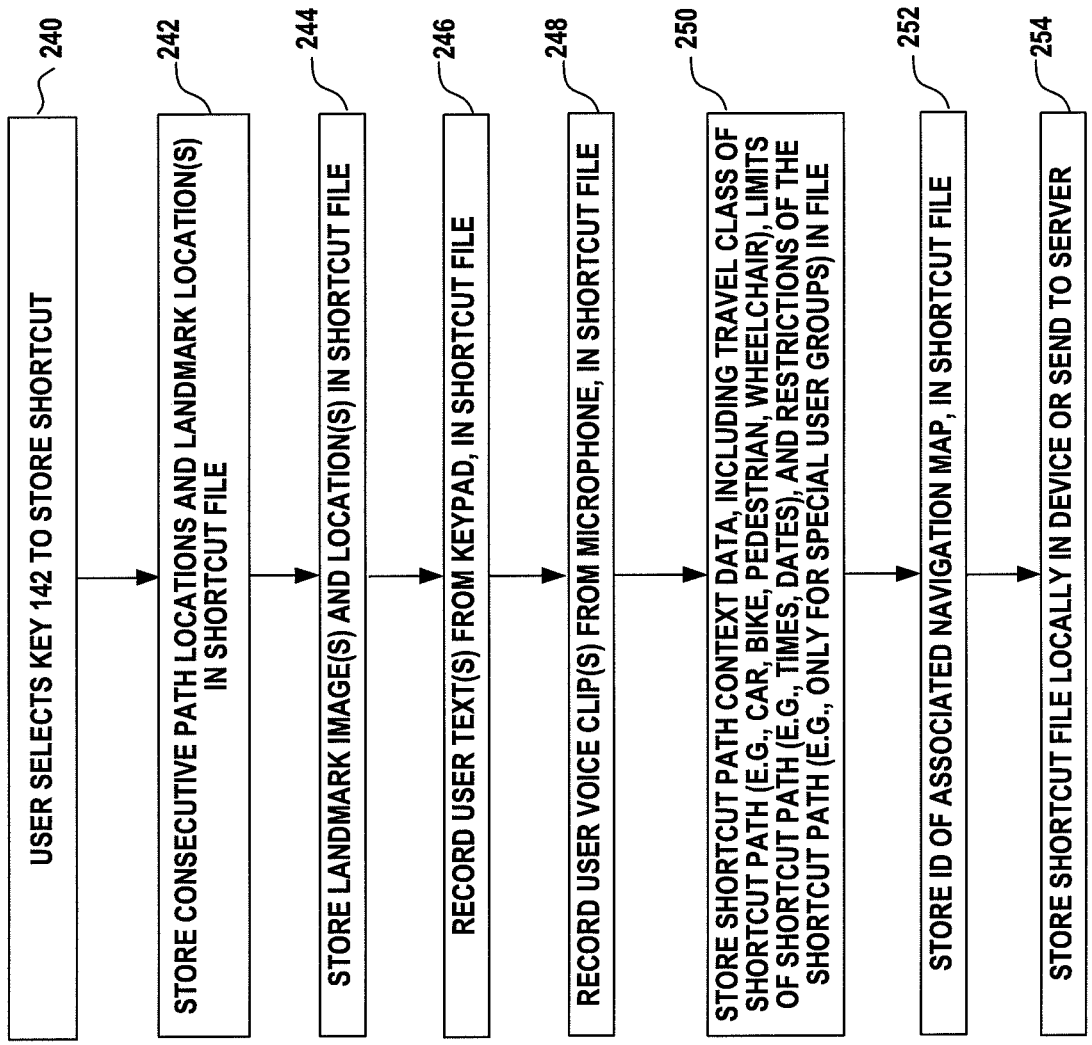
FIG. 2E is a flow diagram of an example embodiment a portion of the navigation program of the mobile wireless device of FIG. 1 performing example steps when a user selects key 142 to store the recorded shortcut either locally in the device or in the server.

FIG. 2E is a flow diagram of an example embodiment a portion of the navigation program 10 of the mobile wireless device of FIG. 1 performing example steps when a user selects key 142 to store individual the recorded shortcuts in the server 160. FIG. 5A is an example of a shortcut file 172 in the random access memory (RAM) 62 of the mobile wireless device 100, storing the context data 175, geographic location information of a shortcut path 170 and the digital image 190 of one or more photographs of landmarks along a shortcut path 170. The individual shortcut file 172, itself, may be stored locally in the memory of the device 100 or uploaded and stored in the server 160 to enable searching for existing recorded shortcuts at a particular location. In step 240 of FIG. 2E, the user selects key 142 to store shortcut file 172. In step 242, the consecutive path locations and landmark locations that have been accumulated while traversing a shortcut path are stored in the shortcut file or object 172. In step 244, one or more landmark images 190 and their location data 192 are stored in the shortcut file. In step 246, one or more texts entered by the user at the from keypad 104, are stored in shortcut file 172. The texts may describe landmark descriptions, path directions, and context data. In step 248, one or more voice clips recorded by the user with the microphone, are stored in the shortcut file 172. In step 250, store the shortcut path context data 175, including Travel Class of the shortcut path (e.g., car, bike, pedestrian, wheelchair, blind pedestrian, disabled pedestrian), Limits of the shortcut path (e.g., times, dates), and Restrictions of the shortcut path (e.g., only for special user groups, such as company employees). In step 252, the identity of any associated navigation map 180 may be stored in the shortcut file 172. And in step 254, the shortcut file or object of FIG. 5A may be uploaded to the server 160.

Figure 5B:
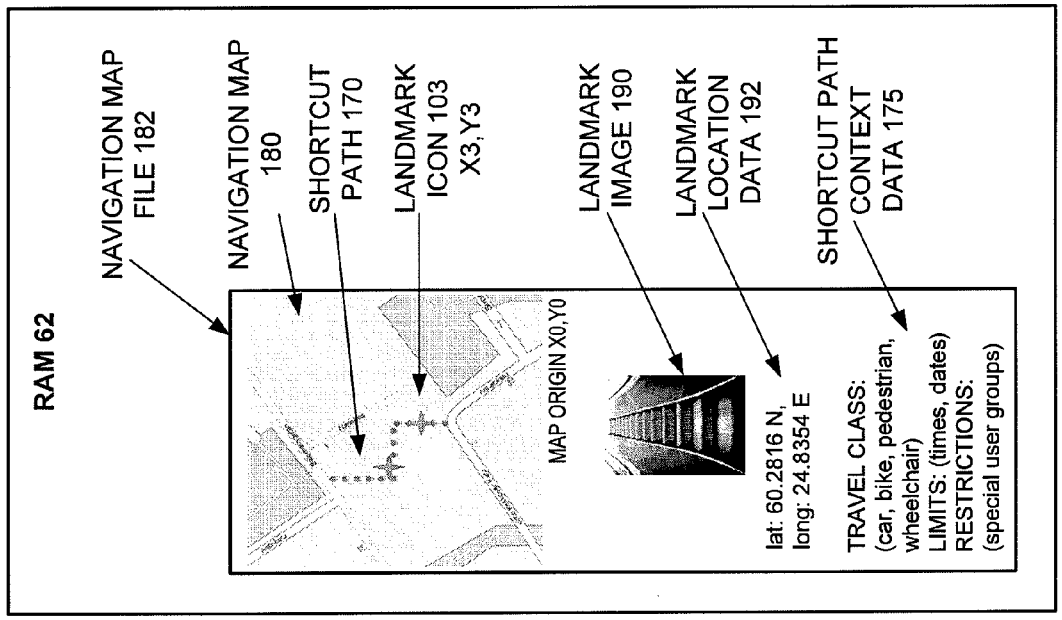
FIG. 5B is an example of a navigation map file in the random access memory (RAM) of the mobile wireless device, storing the navigation map, context data, the geographic location information of a shortcut path and the digital image of the photograph of a landmark along a shortcut path.
Figure 5A:
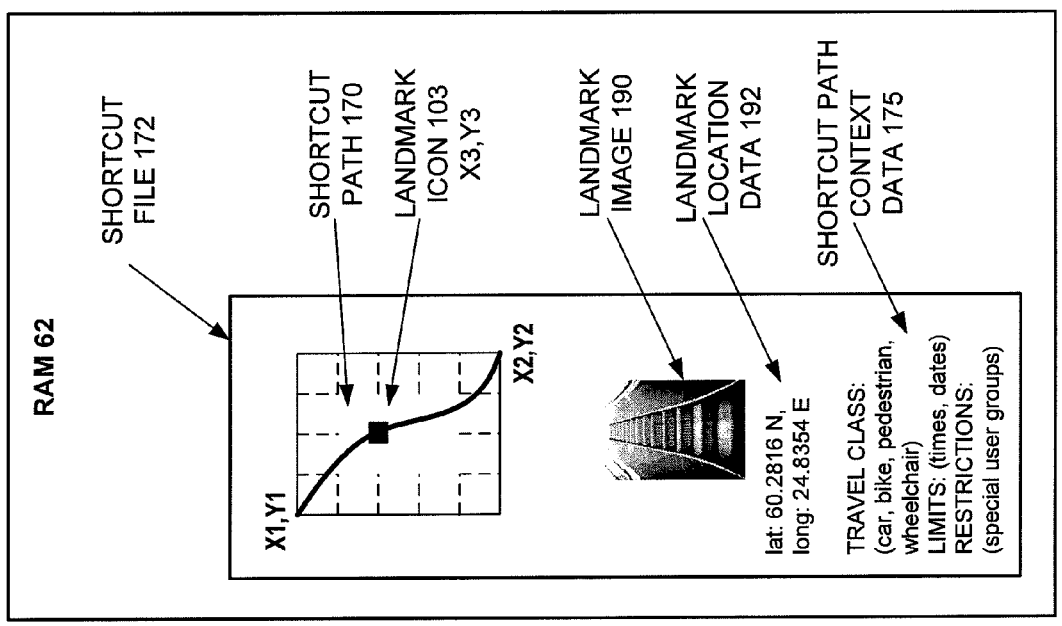
FIG. 5A is an example of a shortcut file in the random access memory (RAM) of the mobile wireless device, storing context data, geographic location information of a shortcut path and the digital image of the photograph of a landmark along a shortcut path.

The steps to locally store or to upload a navigation map file 182, such as is shown in FIG. 5B, are similar to those described in FIG. 2E. In addition to the items stored in a shortcut file 172 of FIG. 5A, there is included a navigation map 180, as shown in FIG. 5B. The navigation map file 182 includes the navigation map 180 and the context data 175, the geographic location information of a shortcut path 170 and the digital image 190 of the photograph of a landmark along a shortcut path 170.

Figure 2F:
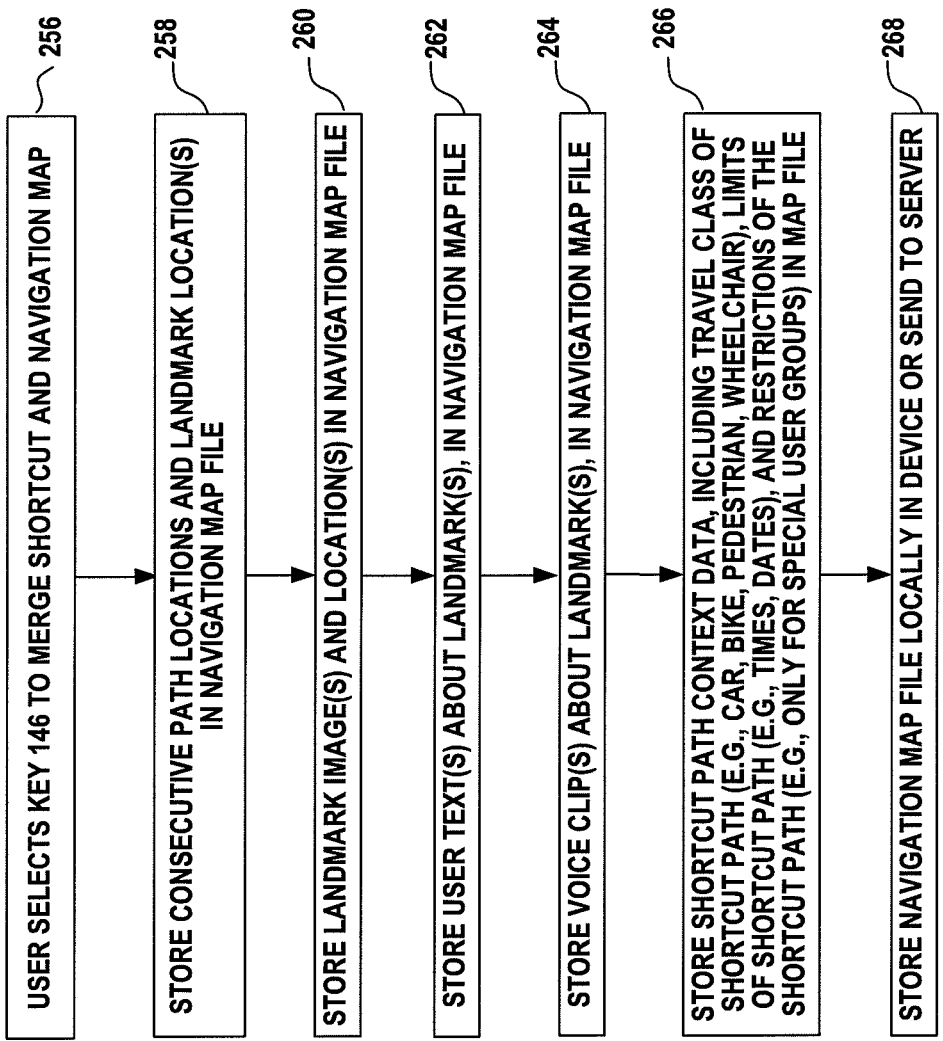
FIG. 2F is a flow diagram of an example embodiment a portion of the navigation program of the mobile wireless device of FIG. 1 performing example steps when a user selects key 146 to merge the recorded shortcut with the associated navigation map in a navigation file and store the navigation file either locally in the device or in the server.

FIG. 2F is a flow diagram of an example embodiment a portion of the navigation program 10 of the mobile wireless device 100 of FIG. 1 performing example steps when a user selects key 146 to merge a recorded shortcut path 170 having one or more recorded landmarks 190 with the associated navigation map 180 in a navigation map file or object 182 and store the navigation map file 182 either locally in the device 100 or in the server 160, as shown in FIG. 6. FIG. 2 shows an example navigation map file 182 and a shortcut file 172 with their common map coordinates X1,Y1 and X2,Y2 juxtaposed. The images displayed on the navigation map 180 and the shortcut path 170 may be represented as bit mapped objects, vector graphics objects, or algorithmically generated objects that are rendered by the image management program 30 to generate the lines and shapes rendered for display on the display 102. In step 256 of FIG. 2F, the user selects key 146 to merge a shortcut path 170 to a navigation map 180 with their common map coordinates X1,Y1 and X2,Y2 juxtaposed. In step 258, the consecutive path locations and landmark icons at locations X3,Y3 that have been accumulated while traversing a shortcut path 170 are stored in the navigation map file 182. In step 260, one or more landmark images 190 and their respective location data 192 are stored in the navigation map file 182. In step 262, one or more texts about the one or more landmarks entered by the user from keypad 104, are stored in navigation map file 182. In step 264, one or more voice clips recorded by the user with the microphone about the one or more landmarks, are stored in the navigation map file 182. In step 266, store the shortcut path context data 175, including Travel Class of the shortcut path (e.g., car, bike, pedestrian, wheelchair, blind pedestrian, disabled pedestrian), Limits of the shortcut path (e.g., times, dates), and Restrictions of the shortcut path (e.g., only for special user groups, such as company employees). And in step 268, the navigation map file 182 of FIG. 5B may be stored locally in the memory of the device 100 or uploaded to the server 160.

Figure 2G:
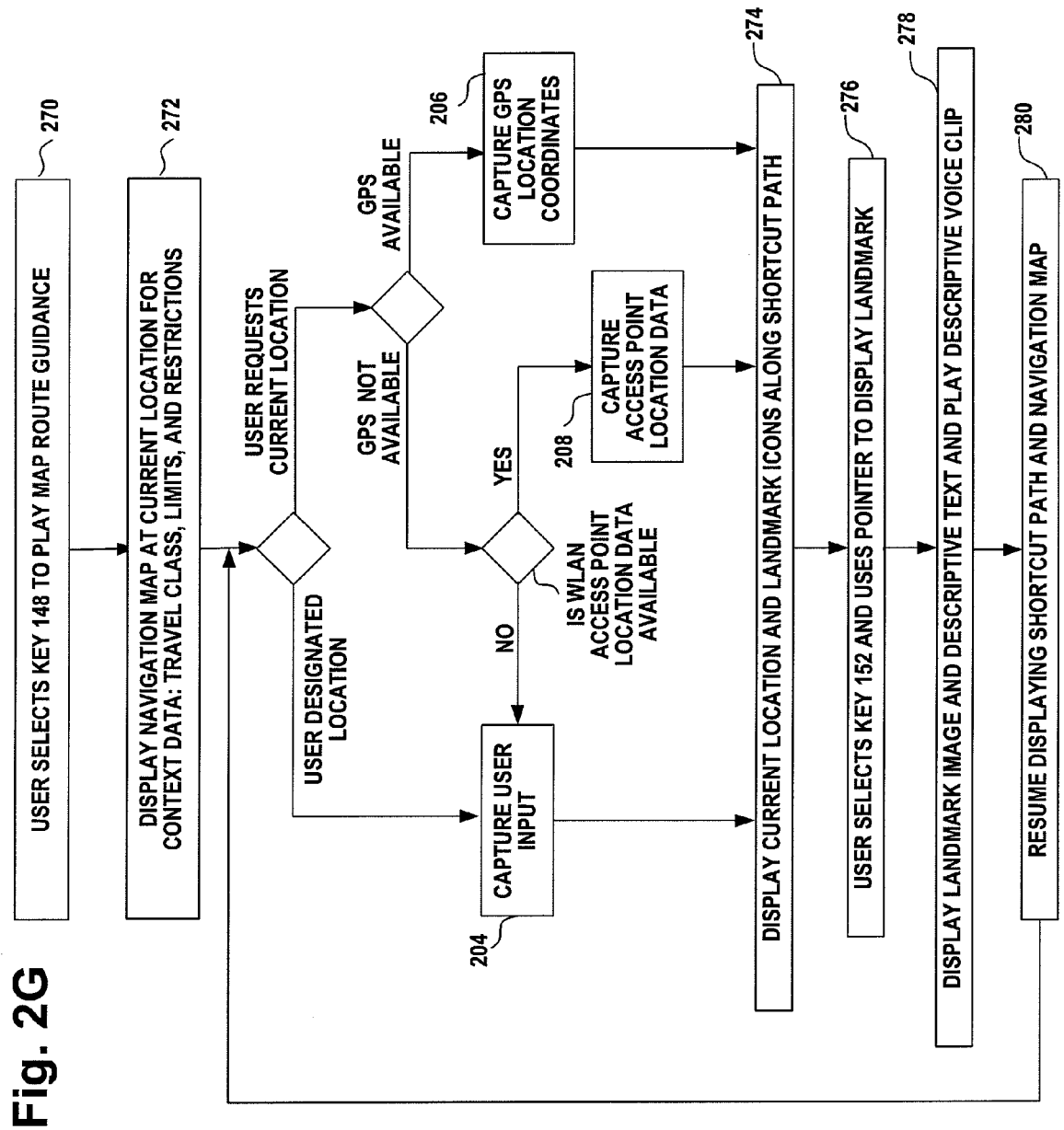
FIG. 2G is a flow diagram of an example embodiment of a portion of the navigation program of the mobile wireless device of FIG. 1 performing example steps when a user selects key 148 to play map route guidance, replaying a navigation map including any recorded shortcut paths associated with the map, tracking the user's current traverse along a recorded shortcut path, and displaying any recorded landmarks along the shortcut path.

FIG. 2G is a flow diagram of an example embodiment a portion of the navigation program 10 of the mobile wireless device 100 of FIG. 1 performing example steps when a user selects key 148 to play map route guidance, replaying a navigation map 180 including any recorded shortcut paths 170 associated with the map, tracking the user's current traverse along a recorded shortcut path 170, and displaying any landmark icons 103 and, if selected, the recorded landmarks 190, along the shortcut path. In Step 270, the user selects key 148 to play map route guidance. Step 272 displays a navigation map at the current location for context data: travel class, limits, and restrictions, including any recorded shortcut paths 170 that have been merged with the map. A decision is made whether the user has selected entering a user designated location, which will go to step 204 to capture the user's input of location data, or whether the user requests the device 100 to determine the current location of the device. If the user requests determining the current location, a decision is made whether GPS location coordinates are available, which will go to step 206 to get the GPS location data. If GPS coordinates are not available, then a decision is made whether access point location data is available, and if it is then the procedure flows to step 208 to get the access point location data. This may be from either WLAN access points 150A, 150B, 150C, cellular telephone base stations, or personal area network (PAN) access points. If access point location data is not available, then the procedure flows to step 204 to capture the user's input of location data. Steps 204, 206, and 208 respectively pass location data to step 274 to display a current position icon at the current location on the displayed navigation map 180 for device 100. In step 276, the user selects key 152 and uses the pointer 101 to display the landmark image 190. Step 278 displays the landmark image 190 and any descriptive text and plays any descriptive voice clip. Then, step 280 resumes displaying the shortcut path 170 and navigation map 180.

Figure 2H:
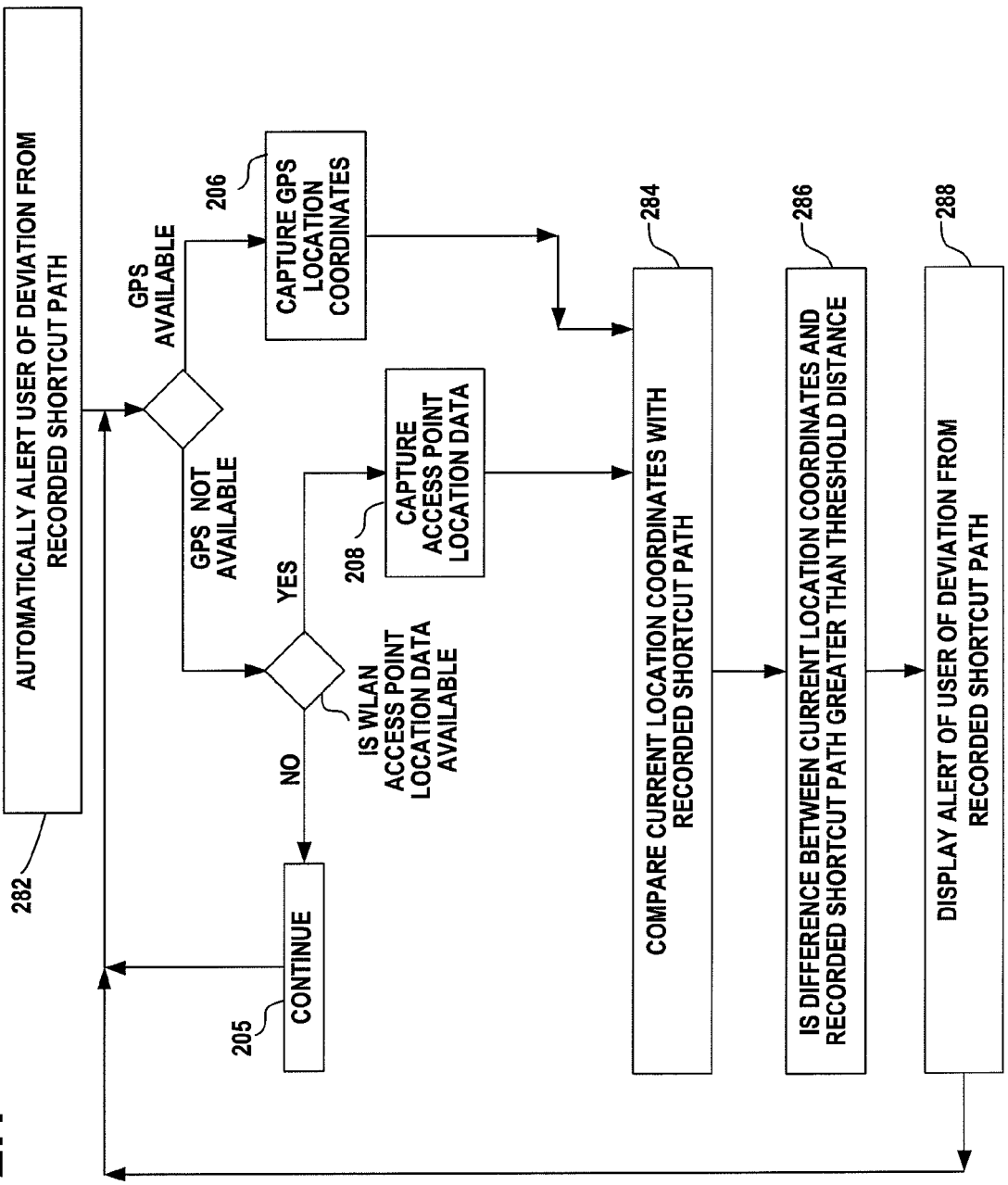
FIG. 2H is a flow diagram of an example embodiment of a portion of the navigation program of the mobile wireless device of FIG. 1 performing example steps to automatically alert user of a deviation in traveling beyond a threshold distance from the recorded shortcut path while attempting to follow the recorded shortcut path.

FIG. 2H is a flow diagram of an example embodiment a portion of the navigation program 10 of the mobile wireless device of FIG. 1 performing example steps to automatically alert the user of a measured deviation $\Delta$ in traveling beyond a threshold distance from the recorded shortcut path while attempting to follow the recorded shortcut path. This embodiment is also useful to alert a blind pedestrian or a disabled pedestrian from walking too closely to a hazard, such as a stairway or a deep gutter. FIG. 9A is an example of a deviation between the recorded shortcut path 170A and the actual path traversed 170A' through the building of FIG. 8A. FIG. 9B illustrates an example of the measured deviation $\Delta$ between the location YR along the recorded shortcut path 170A and the position YA along the actual path 170A' traversed in FIG. 9A. A decision is made whether the user has selected entering a user designated location, which will go to step 204 to capture the user's input of location data, or whether the user requests the device 100 to determine the current location of the device. If the user requests determining the current location, a decision is made whether GPS location coordinates are available, which will go to step 206 to get the GPS location data. If GPS coordinates are not available, then a decision is made whether access point location data is available, and if it is then the procedure flows to step 208 to get the access point location data. This may be from either WLAN access points 150A, 150B, 150C, cellular telephone base stations, or personal area network (PAN) access points. If access point location data is not available, then the procedure flows to step 205 loop back. Steps 206 and 208 respectively pass location data to step 284 to compare the current location coordinates along the actual path traversed 170A' of the device 100 with the recorded shortcut path 170A. Step 286 determines whether the difference between the current location coordinates along the actual path traversed 170A' of the device 100 and the recorded shortcut path 170A is greater than a threshold distance. If the deviation is greater than the threshold, then in step 288, the device 100 displays or sounds an alert to user of a deviation from the recorded shortcut path.

Figure 2I:
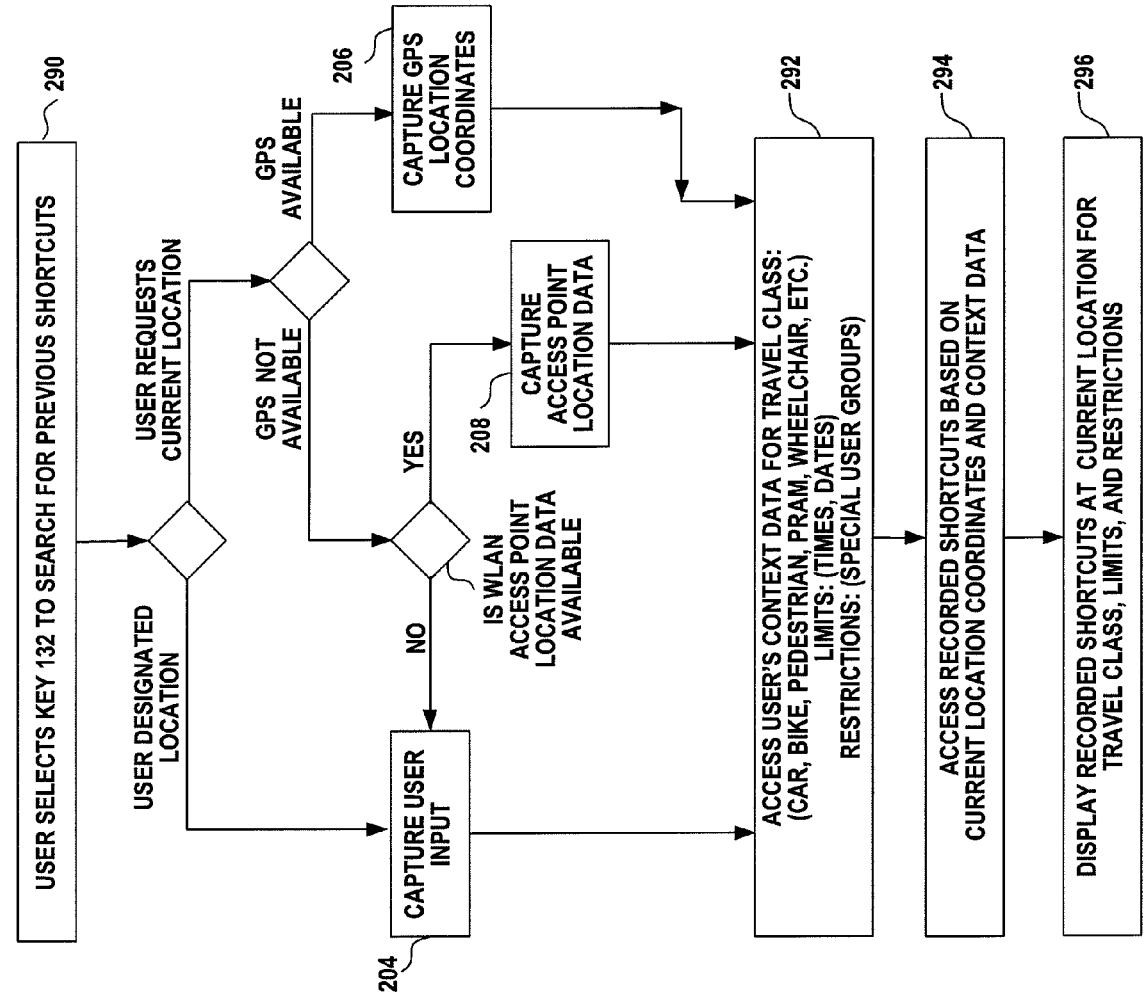
FIG. 2i is a flow diagram of an example embodiment of a portion of the navigation program of the mobile wireless device of FIG. 1 performing example steps when the user selects key 132 to search for previously recorded or pre-installed shortcuts.

FIG. 2i is a flow diagram of an example embodiment of a portion of the navigation program of the mobile wireless device of FIG. 1 performing example steps when in step 290, the user selects key 132 to search for previously recorded or pre-installed shortcuts. A decision is made whether the user has selected entering a user designated location, which will go to step 204 to capture the user's input of location data, or whether the user requests the device 100 to determine the current location of the device. If the user requests determining the current location, a decision is made whether GPS location coordinates are available, which will go to step 206 to get the GPS location data. If GPS coordinates are not available, then a decision is made whether access point location data is available, and if it is then go to step 208 to get the access point location data. This may be from either WLAN access points 150A, 150B, 150C, cellular telephone base stations, or personal area network (PAN) access points. If access point location data is not available, then the procedure flows to step 204 to capture the user's input of location data. Steps 204, 206, and 208 respectively pass location data to step 292 to access user's context data for travel class: (for example, car, bike, pedestrian, pram, wheelchair, blind pedestrian, disabled pedestrian, etc.) limits: (for example, times, dates) restrictions: (for example, special user groups). The procedure then flows to step 294 access recorded shortcuts based on the current location coordinates and context data. The procedure then flows to step 296 display the recorded shortcuts 170 at the current location X1,Y1 for travel class, limits, and/or restrictions.

The current location may be determined for the mobile wireless device 100 with respect to a plurality of wireless access points 150A, 150B, and 150C. The location program 40 is executed by the CPU 60 in the controller 20 to calculate relative positions of the device 100 with respect to the wireless access points 150A, 150B, and 150C based on received signal strengths (RSS), triangulation based on the direction of the received signal, triangulation based on both direction and signal strength of received signals, or other relative positioning methods such as proximity algorithms or other deterministic algorithms. The location program 40 then accesses absolute or estimated positioning information, such as the geographic coordinates, of each of the plurality of wireless access point devices 150A, 150B, and 150C. The geographic coordinates of each of the plurality of wireless access point devices 150A, 150B, and 150C can be stored in a database accessible by the mobile device 100. The absolute or estimated location information can include geographic coordinates and names of places and things near the device's current location. The location program 40 then combines the relative position of the wireless device 100 with the absolute or estimated positioning information of the plurality of access points 150A, 150B, and 150C to obtain a calculated absolute or estimated position of the wireless device 100, such as its own geographic coordinates.

Figure 3:
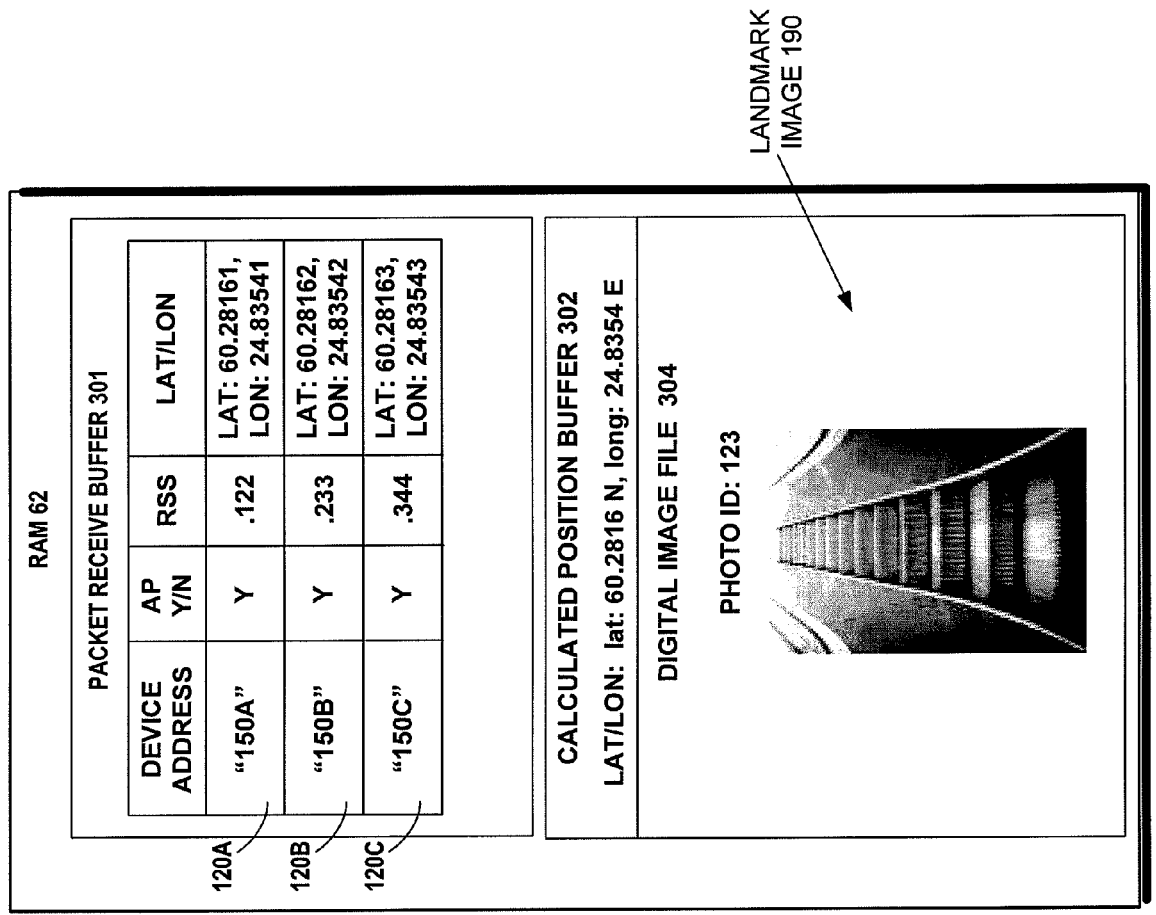
FIG. 3 is an example functional block diagram of the random access memory (RAM) of the mobile wireless device storing the geographic location of the device when it took a photograph of a landmark along a shortcut path, based on the known geographic coordinates of a plurality of access points.

Alternately, the absolute or estimated location information for the access points can be provided in the packets 120A, 120B, and 120C sent by the wireless access points 150A, 150B, and 150C to the mobile device 100. These packets are buffered in the packet receive buffer 301 in the RAM 62 of FIG. 3, which shows the latitude and longitude of each of the access points. In FIG. 3, packet 120A is stored in the packet receive buffer 301 of the RAM 62, with a field designating the device address "150A", a field designating that the sending device 150A is an access point "Y", and a field providing the latitude and longitude of the sending device 150A. Packets 120B and 120C are also stored in the packet receive buffer 301 of the RAM 62 with fields providing the latitude and longitude of the sending devices 150B and 150C, respectively. Other data can be stored in the packet receive buffer 301 of the RAM 62, for example the received signal strength (RSS), which can be used to calculate relative positions of the device 100 with respect to the wireless access points 150A, 150B, and 150C.

Figure 4:
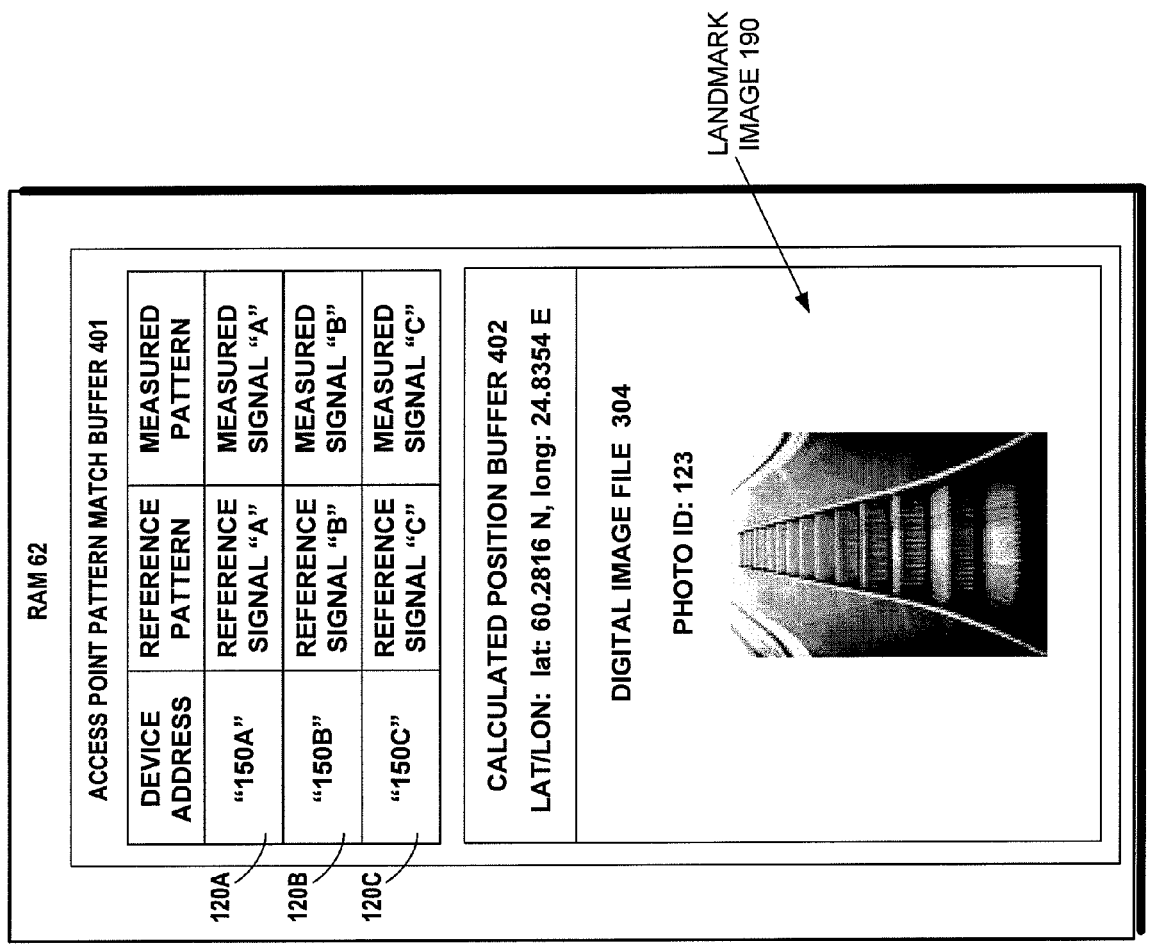
FIG. 4 is an example functional block diagram of the random access memory (RAM) of the mobile wireless device storing the geographic location of the device when it took a photograph of a landmark along a shortcut path, based on "fingerprint" pattern matching of signals from a plurality of access points.

The location program 40 can alternately calculate relative positions of the device 100 with the fingerprinting technique of pattern recognition of the received signals from the access points, matching the received pattern with stored patterns that are associated with known geographic locations. FIG. 4 shows an example of an access point pattern match buffer 401 in the RAM 62, in which the "fingerprint" technique compares the pattern of signals currently received from the access points by device 100 with a reference map of multiple patterns of received signals previously stored in a database. An example pattern is stored in the buffer 401 in the form of the respective sending device address value of packets 120A, 120B, and 120C received by the device 100 and the corresponding reference signal patterns. The currently measured signal patterns of the respective sending devices are also stored in the buffer 401. Then the reference signal patterns and measured signal patterns are compared. There will be many patterns of received signals previously stored in the buffer 401. The best match of the currently measured pattern with a particular stored pattern will be selected and the corresponding geographic location on the reference map is considered to be the calculated absolute or estimated position of the device 100.

The location program 40 may store the calculated absolute or estimated position of the device 100 as data in the calculated position buffer 302 of the RAM 62 of FIG. 3, which is the latitude and longitude of the device 100. The calculated absolute or estimated position of the device 100 may be stored in the digital image file 304 as embedded data 306 along with the stored digital image, as shown in FIG. 4. The names of places and things near the device's current location, along with the geographic coordinates of the device 100, can be stored in the digital image file 304 of FIG. 4.

The photographs may optionally be displayed on the display 102 of the device 100 and the calculated absolute or estimated position of the device 100 can be optionally displayed along with the photograph. The photo can also be placed on a map based on the location coordinates attached to it.

The image transmit program 50 is executed in the CPU 60 of the controller 20 to upload the shortcut file 172 or the navigation map file 182 with the calculated absolute or estimated position data of the device 100 and wirelessly transmit them to other mobile wireless devices or to a wireless access point, for example access point 150A, for storage in the server 160 on the Internet 602. FIG. 6 shows the mobile wireless device 100 uploading the navigation map file 182 with the calculated absolute or estimated position data of the device 100 via the wireless access point 150A and the Internet 602, to the server 160. The wireless access points 150A, B, and C may operate with PAN, WLAN, and cellular telephone protocols.

In embodiments, the calculated absolute or estimated position of the device 100 or the signal patterns measured by the device 100 may be stored in a file separate from, but associated with, the stored digital image of the photograph, in the digital image file of the device. The geographical location determination of the photograph may be performed later. In embodiments, the association of the location data with the photograph may be performed off-line, when the user uploads the digital image of the photograph and the calculated absolute or estimated position of the device 100 or the signal patterns measured by the device 100, to a personal computer or to the server 160 on the Internet 602.

In embodiments, the digital image and the location information may be stored in a variety of media, for example a random access memory (RAM), a programmable read only memory (PROM), a magnetic recording medium such as a video tape, an optical recording medium such as a writeable CDROM or DVD.

In example embodiments, the method can perform the step of determining the current location for the wireless device 100 with respect to the plurality of wireless access points 150A, 150B, and 150C, for example, by analyzing received signals from each of the plurality of access points, to obtain a relative distance value of the wireless device 100 from each of the plurality of access points 150A, 150B, and 150C. The location program 40 determines a current relative position of the device 100 with respect to the plurality of wireless access point devices 150A, 150B, and 150C.

In embodiments, the location program 40 can then access absolute or estimated positioning information, such as the geographic coordinates, of each of the plurality of wireless access point devices 150A, 150B, and 150C. The geographic coordinates of each of the plurality of wireless access point devices 150A, 150B, and 150C can be stored in a database in the mobile device 100 or can be provided in the signals sent by the wireless access points 150A, 150B, and 150C to the mobile device 100. For example, FIG. 1A shows the wireless access point 150A sending packet 120A to the mobile wireless device 100. FIG. 3 shows packet 120A stored in the packet receive buffer 301 of the RAM 62, with a field designating the device address "150A", a field designating that the sending device 150A is an access point "Y", and a field providing the latitude and longitude of the sending device 150A. FIG. 3 shows packet 120B sent from access point 150B and packet 120C sent from access point 150C with similar fields and data. The location program 40 in the mobile device 100 can combine the latitude and longitude values provided in the respective packets 120A, 120B, and 120C of the access points 150A, 150B, and 150C with the relative positions calculated for the device 100 with respect to the respective access points 150A, 150B, and 150C, to compute the absolute or estimated location of the device 100, expressed, for example, in its latitude and longitude.

The geographic coordinates of each of the plurality of wireless access point devices 150A, 150B, and 150C can alternately be provided to the device 100 in removable memory devices such as smart cards, SIMs, WIMs, or semiconductor memories such as a RAM, ROM, or PROM.

An example relative positioning method may determine the relative position of the device 100 based on received signal strengths of signals received by device 100 from each of the wireless access point devices 150A, 150B, and 150C, wherein distances are related to the radio frequency power loss between each respective access point and the device 100. The positioning method may also use round trip time and time of flight measurement techniques. The location program 40 can execute a triangulation algorithm to estimate the location of the device 100 to be at the intersection of circles with their centers at each respective wireless access point device 150A, 150B, and 150C, the radius of the respective circle being determined by the respective received signal strength, round trip time, or time of flight measurement.

Another example relative positioning method may determine the relative position of the device 100 based on the time of arrival or time difference of arrival of a reference signal from the device 100 to each of the wireless access point devices 150A, 150B, and 150C. The difference in the time of arrival of the same reference signal at the three wireless access point devices 150A, 150B, and 150C can be used to calculate the relative position of the device 100 with respect to the access point devices. The location program 40 can execute a triangulation algorithm to estimate the location of the device 100 to be at the intersection of circles with their centers at each respective wireless access point device 150A, 150B, and 150C, the radius of the respective circle being determined by the respective times of arrival of the reference signal.

Another example relative positioning method may determine the relative position of the device 100 based on the angle of arrival of a reference signal from the device 100 to each of the wireless access point devices 150A, 150B, and 150C. The difference in the angle of arrival of the reference signal at the three wireless access point devices 150A, 150B, and 150C can be used to calculate the relative position of the device 100 with respect to the access point devices. Another example location measurement technique is measuring the angle of arrival at the user's mobile wireless device 100, if the device 100 is equipped with multiple antennas. The location program 40 can execute a triangulation algorithm to estimate the location of the device 100 to be at the intersection of lines of position with respect to each respective wireless access point device 150A, 150B, and 150C, the line of position being determined by the respective angle of receipt of the reference signal. The positioning method may also perform triangulation based on both angle of arrival and signal strength techniques.

Another example relative positioning method may determine the relative position of the device 100 based on comparing the pattern of signals currently received by device 100 with a map of multiple patterns of received signals previously stored in a database or downloaded from a central server, a technique known as "fingerprinting". The location program 40 can match the currently received pattern of signals from wireless access point devices 150A, 150B, and 150C with stored patterns in the database, which can be used to calculate the relative position of the device 100 with respect to the access point devices. The stored patterns in the database can also be provided to the device 100 in removable memory devices such as smart cards, SIMs, WIMs, or semiconductor memories such as a RAM, ROM, or PROM. In another example embodiment, the currently measured pattern from a particular location can be uploaded from the user's mobile wireless device 100 to the server 160 for computation of the position, which can then be downloaded to the user's mobile wireless device 100 and attached to the digital image.

FIG. 4 shows an example of an access point pattern match buffer 401 in the RAM 62, which can be used in the "fingerprint" technique of comparing the pattern of signals currently received by device 100 with a map of multiple patterns of received signals previously stored in a database. An example pattern is stored in the buffer 401 in the form of the respective sending device address value of packets 120A, 120B, and 120C received by the device 100 and the corresponding reference signal patterns of the respective sending devices. The currently measured signal patterns of the respective sending devices are received. Then the reference and measured signal patterns are compared for the differences between the corresponding reference and measured values. There will be many patterns of received signals previously stored in the buffer 401. If the result for a particular stored pattern is less than a predetermined threshold value, then the device 100 is estimated to be located near the corresponding calculated position value stored in the buffer 402 in association with the particular stored pattern and the digital image stored in digital image file 304.

The wireless access point devices 150A, 150B, and 150C of FIG. 1 need not be connected to an infrastructure network, and yet they can know their geographic location. If an access point is not connected to an infrastructure network, the unconnected access point it may know its geographic location from using, for example, its own copy of the location program 40. The location program 40 determines the current relative location of the unconnected access point with respect to the plurality of other wireless access point devices, for example, by analyzing received signals from each of the plurality of other wireless access point devices, to obtain a relative distance value from the unconnected access point to each of the plurality of other wireless access point devices and then calculating a relative position of the unconnected access point with respect to the plurality of other access point devices. The positioning method may be by "triangulation" based on signal strengths, wherein distances are proportional to the signal strength. The positioning method may also be by triangulation based on direction of the signal or triangulation based on direction and signal strength. Other positioning methods can include a proximity algorithm or other deterministic algorithms.

After determining the relative position of the wireless device 100, the location program 40 then accesses from each access point the absolute or estimated positioning information, such as geographic coordinates, of each of the plurality of wireless access point devices 150A, 150B, and 150C and combines the calculated relative position of the wireless device 100 with the absolute or estimated positioning information of the plurality 150A, 150B, and 150C to obtain an absolute or estimated position of the wireless device 100, such as its own geographic coordinates.

The RAM 62 of the mobile wireless device 100 may store a sequence digital images of photographs, taken by the digital camera module 105 as a moving picture, with the geographic location information of each of a plurality of the digital images being stored in calculated position buffers, embedded as data in association with the corresponding digital image in a plurality of respective digital image files. The digital camera module 105 records the motion pictures by periodically capturing the sequence of digital images of photographs, for example at thirty images per second, and the controller 20 can further process the sequence as compressed JPEG files or Moving Picture Experts Group (MPEG) files or in another format and store them in the RAM 62. Selected images may be associated with the calculated absolute or estimated position of the wireless device 100 with respect to the geographic coordinates of each of the plurality of wireless access point devices 150A, 150B, and 150C, where the corresponding digital image is captured.

In embodiments, the navigation map file 182 and the shortcut mapping file 172 may be stored in a variety of media, for example a random access memory (RAM), a programmable read only memory (PROM), a magnetic recording medium such as a video tape, an optical recording medium such as a writeable CDROM or DVD.

Figure 7A:
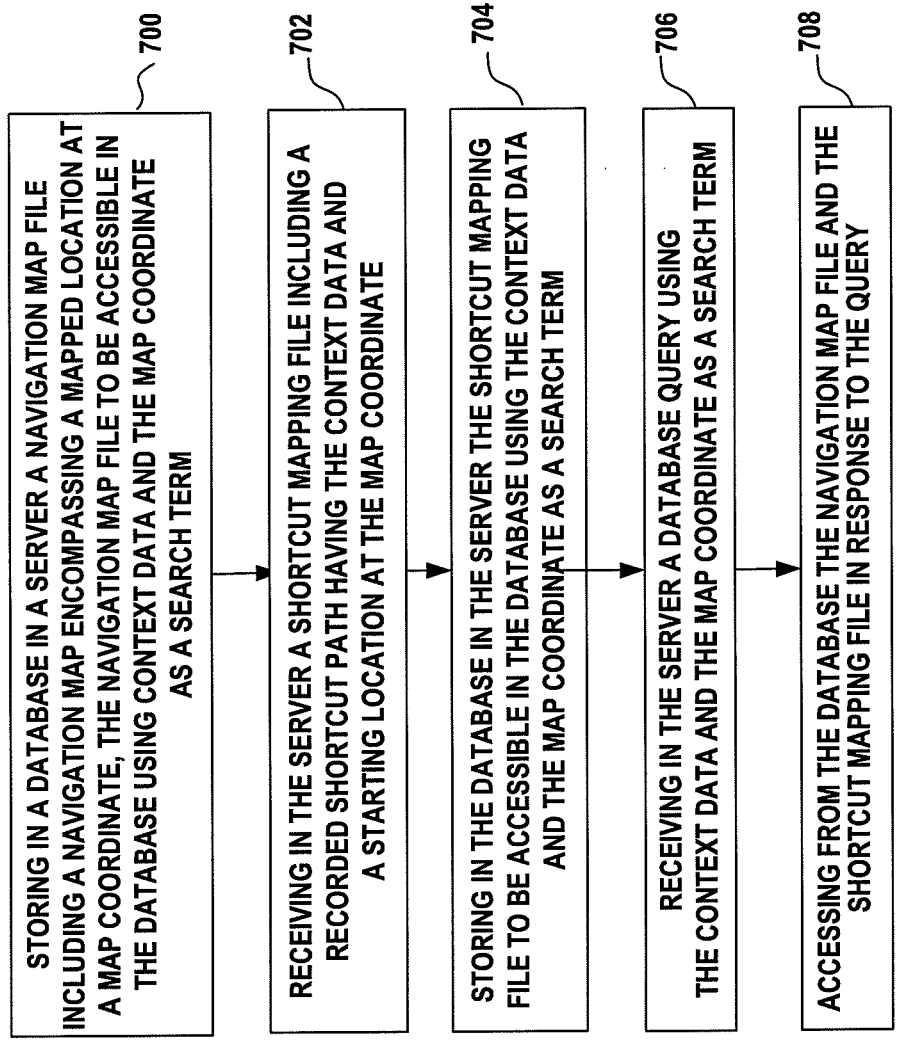
FIG. 7A is a flow diagram of an example embodiment of a server process to store and access from its database the navigation map file and the shortcut mapping file.

FIG. 7A is a flow diagram of an example embodiment of a server process in the server 160 of FIG. 6 to store and access from its database 620 the navigation map file 182 and the shortcut mapping file 172. In step 700, the server process is storing in the database 620 in the server 160 a navigation map file 182 including a navigation map 180 encompassing a mapped location at a map coordinate X1,Y1, the navigation map file 182 to be accessible in the database using the map coordinate X1,Y1 as a search term. In step 702, the server process is receiving at the transceiver 610 in the server 160 a shortcut mapping file 172 including a recorded shortcut path 170 having a starting location at the map coordinate X1,Y1. In step 704, the server process is storing in the database 620 in the server 160 the shortcut mapping file 172 to be accessible in the database using the map coordinate X1,Y1 as a search term. The database 620 may be multiple databases on the same or on multiple servers and the shortcut mapping file 172 may be stored in a different database than that of the navigation map file 182. In step 706, the server process is receiving at the transceiver 610 in the server 160 a database query using the map coordinate X1,Y1 as a search term. In step 708, the server process is accessing from the database 620 the navigation map file 182 and the shortcut mapping file 172 in response to the query.

Figure 7B:
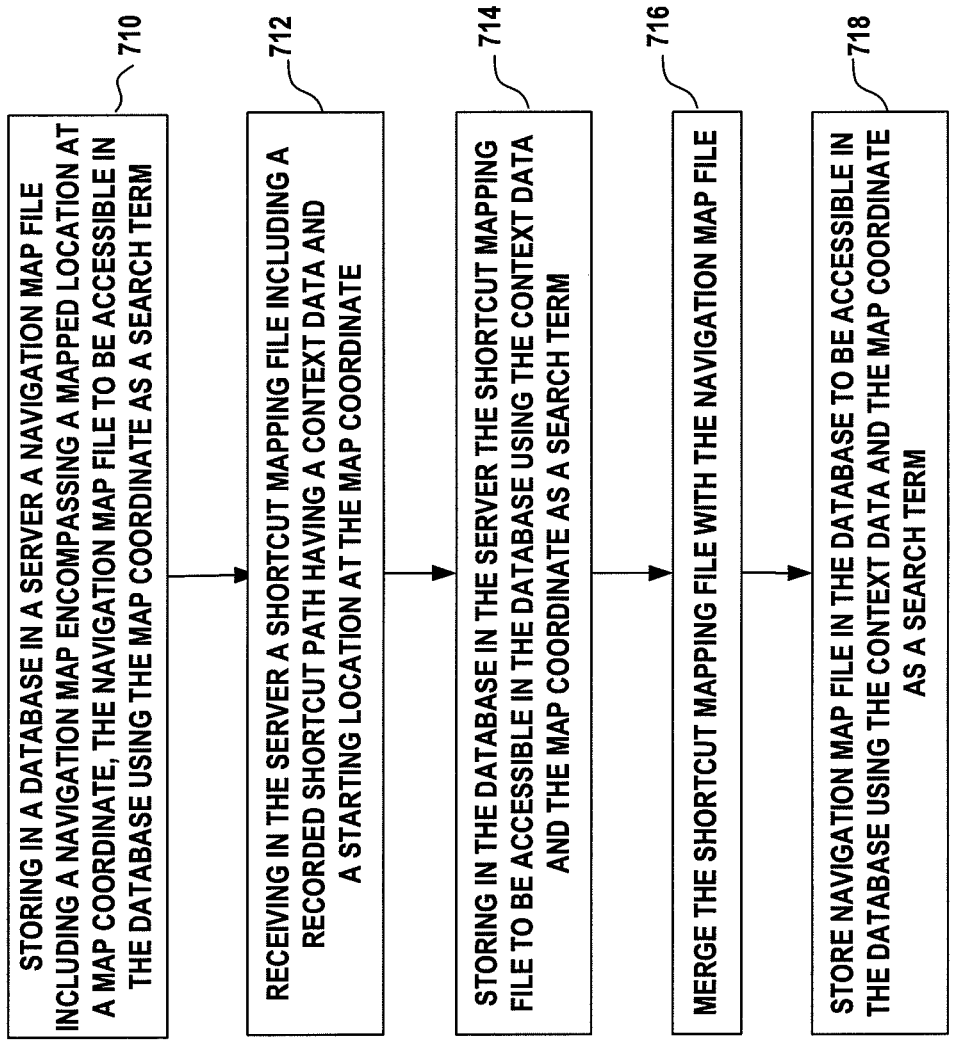
FIG. 7B is a flow diagram of an example embodiment of a server process to merge the navigation map file and the shortcut mapping file.

FIG. 7B is a flow diagram of an example embodiment of a server process to merge the navigation map file and the shortcut mapping file. In step 710, the server process is storing in the database 620 in the server 160 a navigation map file 182 including a navigation map 180 encompassing a mapped location at a map coordinate X1,Y1, the navigation map file 182 to be accessible in the database using the map coordinate X1,Y1 as a search term. In step 712, the server process is receiving at the transceiver 610 in the server 160 a shortcut mapping file 172 including a recorded shortcut path 170 having a starting location at the map coordinate X1,Y1. In step 714, the server process is storing in the database 620 in the server 160 the shortcut mapping file 172 to be accessible in the database using the map coordinate X1,Y1 as a search term. In step 716, the server process is merging the shortcut mapping file 172 with the navigation map file 182. In step 708, the server process is storing the navigation map file 182 in the database to be accessible in the database using the context data and the map coordinate as a search term.

Figure 8A:
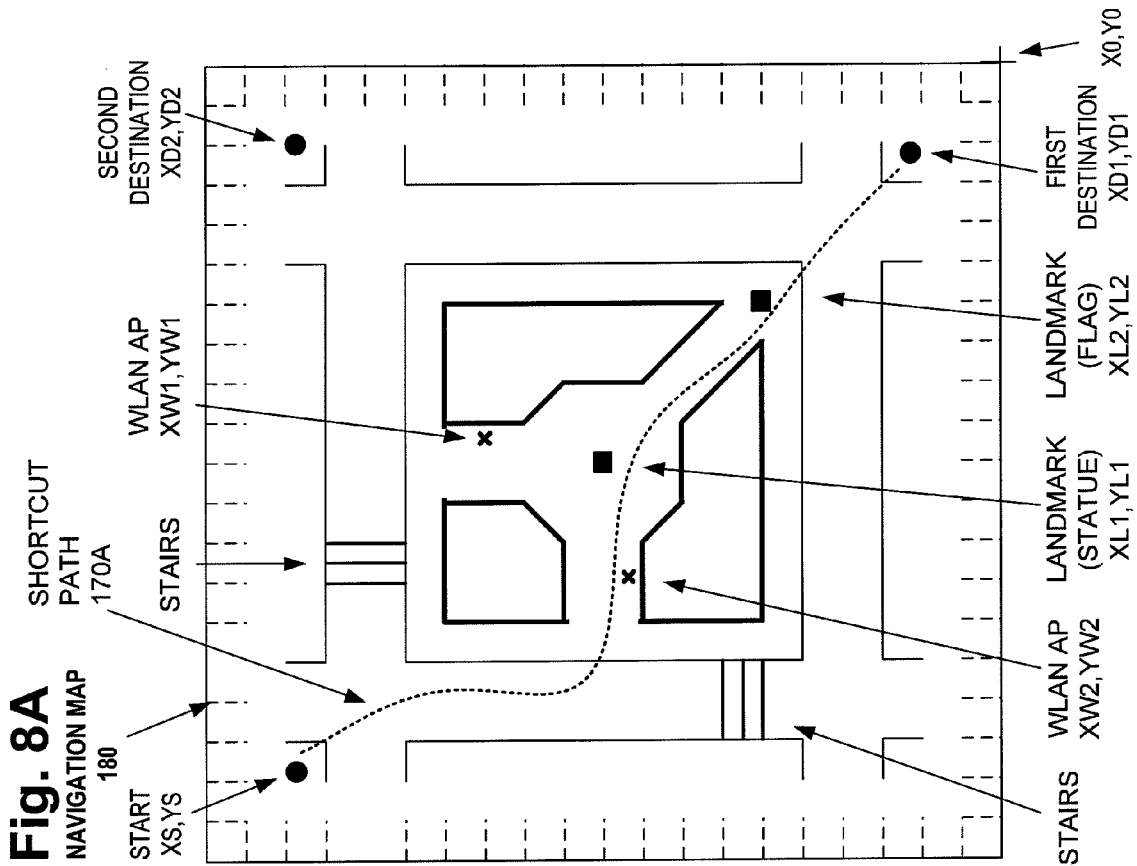
FIG. 8A is a first example of a first shortcut path through a building, with the corresponding context data record and descriptive text for the first shortcut path.
Figure 9B:
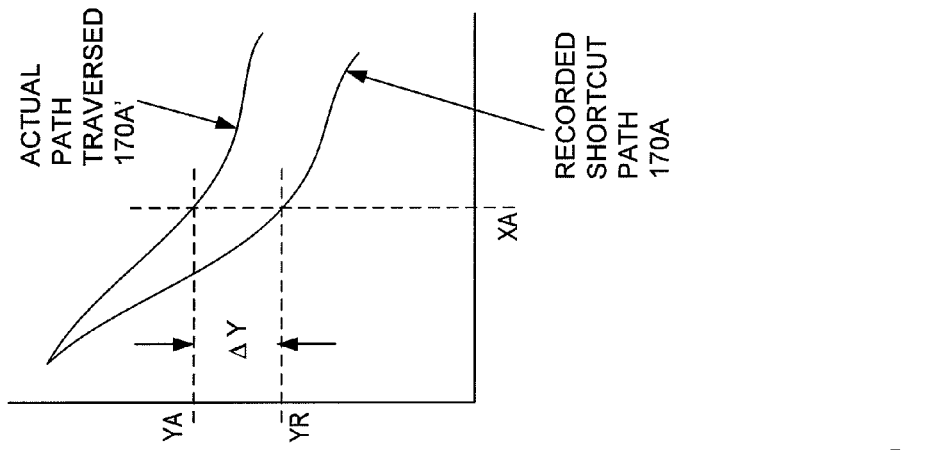
FIG. 9B illustrates an example of measuring the deviation between the recorded shortcut path and the actual path traversed in FIG. 9A.
Figure 9A:
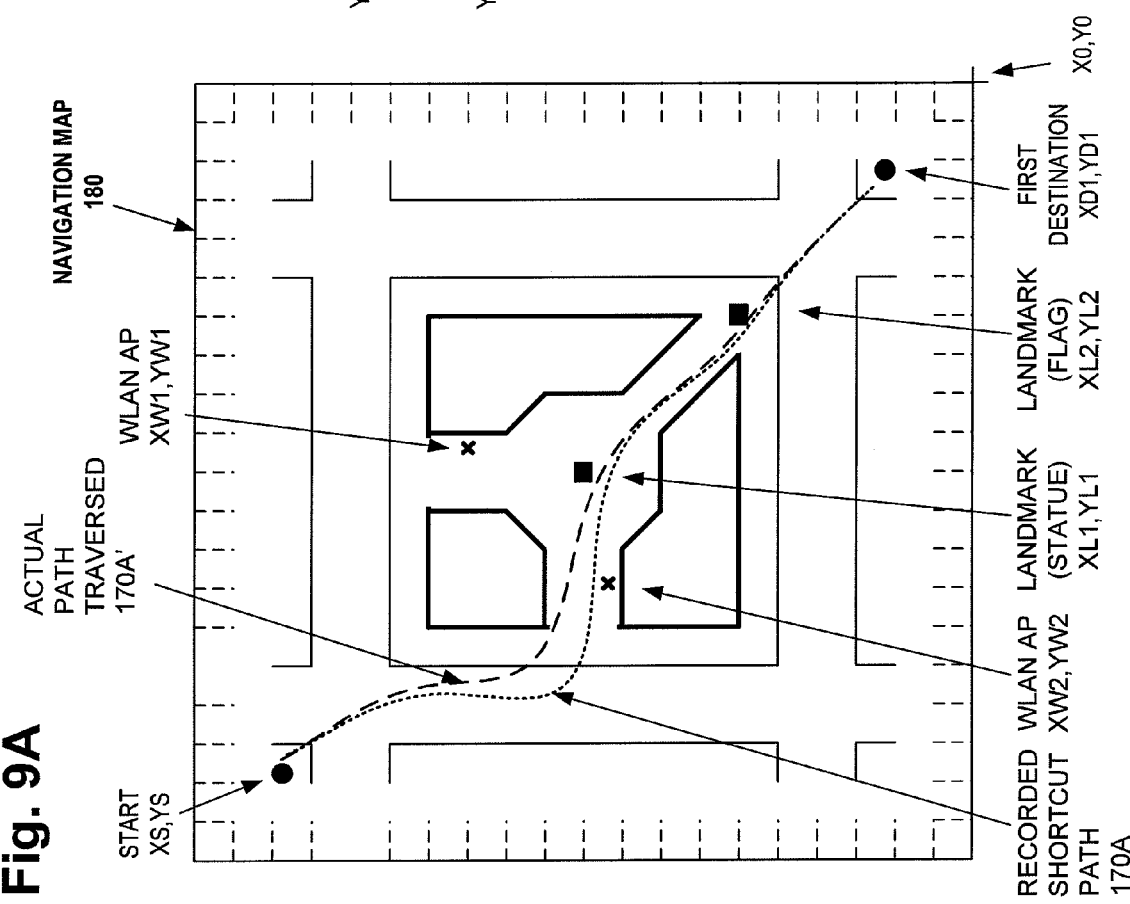
FIG. 9A is an example of a deviation between the recorded shortcut path and the actual path traversed through the building of FIG. 8A.

FIG. 8A is a first example of a first recorded shortcut path 170A from a starting location XS,YS through a building to a first destination location XD1,YD1. GPS location signals can be used by the device 100 outside of the building, and WLAN access point signals are available within the building. A first WLAN access point (AP) is located inside the entrance of the north door of the building at coordinates XW1,YW1. A second WLAN access point (AP) is located inside the entrance of the west door of the building at coordinates XW2,YW2. Two landmarks are present in or near the building. A statue landmark is located in the central hall at coordinates XL1,YL1. A flag pole landmark is located just outside the southeast door of the building at coordinates XL2,YL2. The first recorded shortcut path 170A was created by another, prior user on a prior traverse of the path and the shortcut path file was pre-installed on the device 100. The first shortcut 170A was chosen to accommodate a person in a wheelchair, so it specifically avoids stairs. Included in the shortcut path file for first recorded shortcut path 170A is a context data record 175A and the descriptive text 190A, which were created by the prior user, as shown in FIG. 8A. The context data record 175A includes the specific travel class of pedestrian and wheelchair, which the prior user judged was appropriate for the shortcut path. The context data record 175A includes the specific times between 0800 and 1800 on weekdays, which the prior user judged was appropriate for the passage through the building on the shortcut path. No other restrictions were included in the context data record 175A. The descriptive text 190A was created by the prior user to provide helpful descriptions and directions for traversing the shortcut path 170A. During the traverse by the prior user, the controller 20 accumulated the distance traveled over the shortcut path 170A and stored that value, 650 meters, in the context data record 175A. The context data record 175A includes the starting location XS,YS, destination location XD1,YD1, and pointer addresses to the associated navigation map file 182, the shortcut file 172A, and the descriptive text 190A.

Figure 8B:
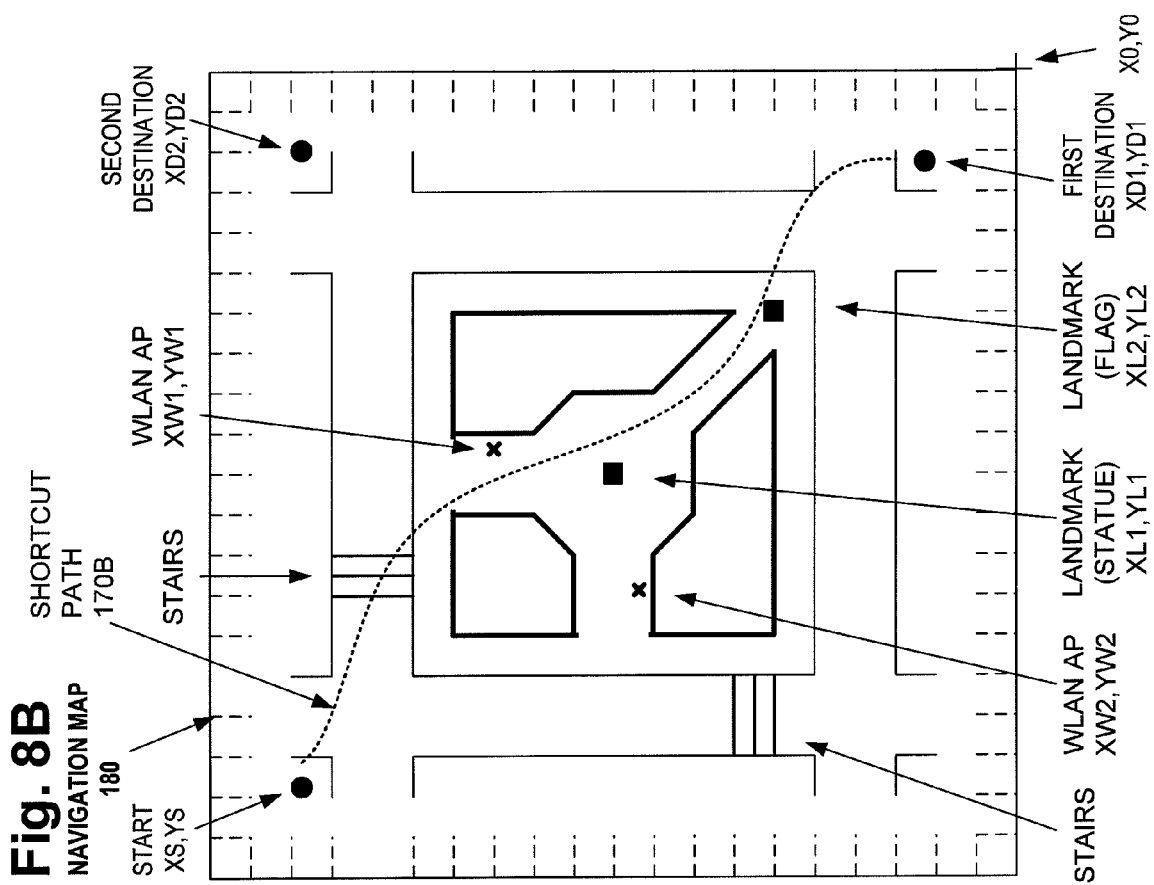
FIG. 8B is a second example of a shortcut path through the building of FIG. 8A, with the corresponding context data record and descriptive text for the second shortcut path.

FIG. 8B is a second example of a second recorded shortcut path 170B from the starting location XS,YS through the building to the first destination location XD1,YD1. The second recorded shortcut path 170B was created a prior user on a prior traverse of the path and the shortcut path file was pre-installed on the device 100. The path was chosen for use by ordinary pedestrians, so it includes a stairway. The context data record 175B includes the specific travel class of pedestrian, which the prior user judged was appropriate for the shortcut path. The context data record 175B includes the specific times between 0800 and 1800 on weekdays, which the prior user judged was appropriate for the passage through the building on the shortcut path. No other restrictions were included in the context data record 175B. The descriptive text 190B was created by the prior user to provide helpful descriptions and directions for traversing the shortcut path 170B. During the traverse by the prior user, the controller 20 accumulated the distance traveled over the shortcut path 170B and stored that value, 600 meters, in the context data record 175B. The context data record 175B includes the starting location XS,YS, destination location XD1,YD1, and pointer addresses to the associated navigation map file 182, the shortcut file 172B, and the descriptive text 190B.

FIG. 8C is a third example of a third recorded shortcut path 170C from the starting location XS,YS through the building to a second destination location XD2,YD2. The second recorded shortcut path 170C was created a prior user on a prior traverse of the path and the shortcut path file was pre-installed on the device 100. The path was chosen for use by a person in a wheelchair, so it avoids the stairway along a more direct route. The context data record 175C includes the specific travel class of pedestrian and wheelchair, which the prior user judged was appropriate for the shortcut path. The context data record 175C includes the specific times between 0800 and 1800 on weekdays, which the prior user judged was appropriate for the passage through the building on the shortcut path. No other restrictions were included in the context data record 175C. The descriptive text 190C was created by the prior user to provide helpful descriptions and directions for traversing the shortcut path 170C. During the traverse by the prior user, the controller 20 accumulated the distance traveled over the shortcut path 170C and stored that value, 500 meters, in the context data record 175C. The context data record 175C includes the starting location XS,YS, destination location XD2,YD2, and pointer addresses to the associated navigation map file 182, the shortcut file 172C, and the descriptive text 190C.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in networks other than WiMedia networks.

What is claimed is:

1. A method, comprising:
    storing context data in a wireless device, the context data including a travel class, limits, and restrictions regarding a shortcut path for the wireless device;
    registering, by the wireless device a starting location for the shortcut path;
    recording, by the wireless device, one or more determined locations of the device as the device moves along the shortcut path;
    receiving and recording information regarding a landmark at a one of the locations along the shortcut path; and
    forming a shortcut map including the recorded shortcut path, the information regarding the landmark, and information about the context data, wherein the shortcut map is based at least in part on the context data.

2. The method of claim 1, further comprising:
    storing the shortcut map to be accessible with a query based on the starting location for the shortcut path and the context data, in at least one of a memory in the wireless device or a database in a server.

3. The method of claim 1, further comprising:
    automatically accessing the shortcut map with a query based on a current location of the wireless device and the context data.

4. The method of claim 1, further comprising:
    automatically accessing a shortcut map pre-installed in the wireless device, with a query based on a current location of the wireless device and the context data.

5. The method of claim 1, further comprising:
    automatically accessing a shortcut map provided by a remote user, with a query based on a current location of the wireless device and the context data.

6. The method of claim 1, further comprising:
    displaying, by the wireless device, the shortcut path on a navigation map by juxtaposing the starting location of the shortcut path with the same location in the navigation map.

7. The method of claim 1, further comprising:
    displaying, by the wireless device, the recorded shortcut path and the information regarding the landmark, in response to a selection of an icon displayed on the shortcut path.

8. The method of claim 1, further comprising:
    forming a navigation map object combining the shortcut path with a navigation map and equating the starting location of the shortcut path with the same respective location in the navigation map; and
    storing the navigation map object to be accessible by the starting location for the shortcut path and the context data, in at least one of a memory in the wireless device or a database in a server.

9. The method of claim 1, wherein the information regarding the landmark comprises at least one of a digital photograph, text describing the landmark, text describing path directions, or a voice clip.

10. The method of claim 1, wherein the travel class data comprises at least one of car, bike, pedestrian, pram, wheelchair, walker, blind pedestrian, or disabled pedestrian.

* * * * *